US010445352B2

(12) United States Patent
Vee et al.

(10) Patent No.: US 10,445,352 B2
(45) Date of Patent: Oct. 15, 2019

(54) NATURAL-LANGUAGE RENDERING OF STRUCTURED SEARCH QUERIES

(71) Applicant: Facebook, Inc., Menlo Park, CA (US)

(72) Inventors: Erik N. Vee, San Mateo, CA (US); Olivier Chatot, E. Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 577 days.

(21) Appl. No.: 15/073,374

(22) Filed: Mar. 17, 2016

(65) Prior Publication Data

US 2016/0196335 A1 Jul. 7, 2016

Related U.S. Application Data

(63) Continuation of application No. 13/731,866, filed on Dec. 31, 2012, now Pat. No. 9,367,607.

(51) Int. Cl.
*G06F 16/332* (2019.01)
*G06F 16/242* (2019.01)
*G06F 16/248* (2019.01)
*G06F 16/338* (2019.01)
*G06F 16/951* (2019.01)
(Continued)

(52) U.S. Cl.
CPC ........ *G06F 16/3329* (2019.01); *G06F 16/243* (2019.01); *G06F 16/248* (2019.01); *G06F 16/24522* (2019.01); *G06F 16/338* (2019.01); *G06F 16/951* (2019.01);
(Continued)

(58) Field of Classification Search
None
See application file for complete search history.

(56) References Cited

U.S. PATENT DOCUMENTS 5,909,678 A * 6/1999 Bergman ............ G06F 16/3322
6,009,422 A 12/1999 Ciccarelli
(Continued)

FOREIGN PATENT DOCUMENTS

CN 101884041 A 11/2010
CN 102298612 A 12/2011
(Continued)

OTHER PUBLICATIONS

GeoStore Web Client May 2, 2012, Codenuggets, http://codenuggets.com/2012/05/02/geostore-web-client.*
(Continued)

*Primary Examiner* — Jason G Liao
(74) *Attorney, Agent, or Firm* — Baker Botts L.L.P.

(57) ABSTRACT

In one embodiment, a method includes receiving an unstructured text query inputted by a first user, identifying one or more objects associated with the online social network matching at least a portion of the unstructured text query, accessing a context-free grammar model comprising a plurality of grammars, generating one or more structured queries, each structured query corresponding to a selected grammar of a context-free grammar model, wherein each structured query is based on a natural-language string generated by the selected grammar, each structured query comprising at least one query token corresponding to each of the identified object, and sending one or more of the structured queries as suggested queries for display to the first user in response to the unstructured text query inputted by the first user.

20 Claims, 15 Drawing Sheets

(51) Int. Cl.
  *G06F 17/27* (2006.01)
  *G06Q 30/02* (2012.01)
  *G06Q 50/00* (2012.01)
  *G06F 16/2452* (2019.01)

(52) U.S. Cl.
  CPC ....... *G06F 17/271* (2013.01); *G06Q 30/0241* (2013.01); *G06Q 50/01* (2013.01)

(56) References Cited

U.S. PATENT DOCUMENTS

| | | |
|---|---|---|
| 6,957,184 B2 | 10/2005 | Schmid |
| 7,324,936 B2 | 11/2008 | Saldania |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Smit |
| 8,180,804 B1 | 5/2012 | Narayanan |
| 8,239,364 B2 | 8/2012 | Wable |
| 8,271,471 B1 | 9/2012 | Kamvar |
| 8,271,546 B2 | 9/2012 | Gibbs |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,595,297 B2 | 11/2013 | Marcucci |
| 8,601,027 B2 | 12/2013 | Behforooz |
| 9,105,068 B2 | 8/2015 | Lee |
| 2004/0172237 A1 | 9/2004 | Saldanha |
| 2005/0131872 A1 | 6/2005 | Calbucci |
| 2006/0074631 A1 | 4/2006 | Wang |
| 2006/0123045 A1 | 6/2006 | Chang |
| 2006/0190436 A1 | 8/2006 | Richardson |
| 2006/0212433 A1 | 9/2006 | Stachowiak |
| 2007/0277100 A1 | 11/2007 | Sheha |
| 2008/0255977 A1 | 10/2008 | Altberg |
| 2008/0270615 A1 | 10/2008 | Centola |
| 2009/0006543 A1 | 1/2009 | Smit |
| 2009/0094209 A1 | 4/2009 | Marvit |
| 2009/0228296 A1 | 9/2009 | Ismalon |
| 2009/0265329 A1 | 10/2009 | Korupolu |
| 2009/0281988 A1 | 11/2009 | Yoo |
| 2010/0049802 A1 | 2/2010 | Raman |
| 2010/0228744 A1 | 9/2010 | Craswell |
| 2010/0235354 A1 | 9/2010 | Gargaro |
| 2010/0274804 A1 | 10/2010 | Muskal |
| 2011/0078166 A1 | 3/2011 | Oliver |
| 2011/0087534 A1 | 4/2011 | Strebinger |
| 2011/0137902 A1 | 6/2011 | Wable |
| 2011/0184893 A1 | 7/2011 | Paparizos |
| 2011/0191364 A1 | 8/2011 | Lebeau |
| 2011/0191371 A1 | 8/2011 | Elliott |
| 2011/0196855 A1 | 8/2011 | Wable |
| 2011/0258148 A1 | 10/2011 | Gao |
| 2011/0313992 A1 | 12/2011 | Groeneveld |
| 2011/0320470 A1 | 12/2011 | Williams |
| 2012/0001919 A1 | 1/2012 | Lumer |
| 2012/0078953 A1 | 3/2012 | Araya |
| 2012/0117516 A1 | 5/2012 | Guinness |
| 2012/0130942 A1 | 5/2012 | Dipper |
| 2012/0158720 A1 | 6/2012 | Luan |
| 2012/0233197 A1 | 9/2012 | Tsai |
| 2012/0271831 A1 | 10/2012 | Narayanan |
| 2012/0278127 A1 | 11/2012 | Kirakosyan |
| 2012/0284329 A1 | 11/2012 | van den Oord |
| 2012/0303703 A1 | 11/2012 | Richter |
| 2012/0310929 A1 | 12/2012 | Patterson |
| 2012/0311034 A1 | 12/2012 | Goldband |
| 2012/0323909 A1 | 12/2012 | Behforooz |
| 2013/0024439 A1 | 1/2013 | Reinholdtsen |
| 2013/0031106 A1 | 1/2013 | Schechter |
| 2013/0041876 A1 | 2/2013 | Dow |
| 2013/0054631 A1 | 2/2013 | Govani |
| 2013/0066876 A1 | 3/2013 | Raskino |
| 2013/0086057 A1 | 4/2013 | Harrington |
| 2013/0097137 A1 | 4/2013 | Kritt |
| 2013/0254155 A1 | 9/2013 | Thollot |
| 2014/0188862 A1 | 7/2014 | Campbell |
| 2014/0188899 A1 | 7/2014 | Whitnah |
| 2014/0188935 A1 | 7/2014 | Vee |
| 2016/0203237 A1 | 7/2016 | Whitnah |

FOREIGN PATENT DOCUMENTS

| | | |
|---|---|---|
| CN | 102741844 A | 10/2012 |
| EP | 2750085 A1 | 7/2014 |
| JP | 2010277322 A | 12/2010 |
| JP | 2012008610 A | 1/2012 |
| JP | 2017037668 A | 2/2017 |
| KR | 10-2009-0053178 | 5/2009 |
| WO | WO 2012/128888 A2 | 9/2012 |

OTHER PUBLICATIONS

Daly, Natural Language Processing for prgrommaners part 2: Failing at text generation since 1960 Mar. 18, 2016, WorldWritable, https://worldwritable.com/natural-language-processing-for-programmers-90c4e04dc6de.*

Daly, Natural Language Processing for prgrommaners part 1: My introduction Mar. 18, 2016, WorldWritable, https://worldwritable.com/natural-language-processing-for-programmers-c21a4aff3cb9.*

Notification of Reason for Rejection of Japanese Patent Application No. 2016-164767, dated Sep. 5, 2017.

Notification of the First Office Action for CN Application No. 201380074171.2 (with English translation), dated Mar. 12, 2018.

EP Communication received from EPO for Patent Application No. 13197989.0-1217, dated Aug. 23, 2018.

State Intellectual Property Office of the People's Republic of China Notification of the First Office Action for Application No. 201380074096.X (with English translation), dated Jan. 17, 2018.

State Intellectual Property Office of the People's Republic of China Search Report for Application No. 201380074096.X (with English translation), dated Dec. 15, 2017.

IP Australia, Patent Examination Report No. 1 for Application No. 2016204542, dated Aug. 8, 2017.

Korean Intellectual Property Office Notice of Allowance for Application No. 10-2015-7020902 (with English translation), dated Sep. 13, 2016.

MX Office Action received for Patent Application No. MX/a/2016/016058. (with English Translation), dated Jul. 11, 2018.

IP Australia, Patent Examination Report No. 1 for Patent Application No. 2013368262, dated May 26, 2016.

Byrne, K., "*Populating the Semantic Web—Combining Text and Relational Databases as RDF Graphs*," University of Edinburgh, 2008.

Notification of Reason for Rejection of Japanese Patent Application No. 2015-550685, dated May 31, 2016.

European Patent Office Communication pursuant to Article 94(3) EPC for Application No. 13 197 989.0-1871, dated May 29, 2017.

Israeli Patent Authority Office Action Re: Defects Prior to Notification of Acceptance of Israeli Patent Application No. 239662 (with English translation), dated Jul. 14, 2016.

U.S. Appl. No. 15/596,888, filed May 16, 2017, Whitnah.
U.S. Appl. No. 15/608,759, filed May 30, 2017, Campbell.
U.S. Appl. No. 13/731,939, filed Dec. 31, 2012, Campbell.
U.S. Appl. No. 15/073,339, filed Mar. 17, 2016, Whitnah.

Extended European Search Report for 13197989.0-1955, dated Mar. 6, 2014.

Extended Eurpoean Search Report for 13197468.5-1958, dated Mar. 6, 2014.

Customizing Results Snippets—Custom Search—Google Developers, https://developers,google.com/custom-search/docs/snippets, Nov. 21, 2012.

(56) References Cited

OTHER PUBLICATIONS

Grune, D. et al., "Parsing Techniques, A Practical Guide", Second Edition, Monographs in Computer Science, 2008 Springer Science+ Business Media LLC, 2008.
Pynadath, D.V. et al, "Generalized Queries on Probabilistic Context-Free Grammars", IEEE Transactions on Pattern Analysis and Machine Intelligence, vol. 20, No. 1, Jan. 1998.
Li, G et al., "Efficient Type-ahead Search on Relational Data: A Tastier Approach," SIGMOD-PODS, Jun. 29, 2009.
Wu, S. et al., "Instant Social Graph Search," Advances in Knowledge Discovery and Data Mining, May 29, 2012.
International Search Report and Written Opinion for International Application PCT/US2013/075536, dated Mar. 26, 2014.
International Search Report and Written Opinion for International Application PCT/US2013/076820, dated Mar. 26, 2014.
Summons to attend proceedings pursuant to Rule 115(1) EPC for EP Application No. 13197468.5, dated May 27, 2015.
IP Australia Examination Report No. 1 for standard patent application for Application No. 2017201443, dated Nov. 20, 2017.
European Patent Office Decision to refuse a European Patent Application for Application No. 13 197 468.5-1958, dated Mar. 4, 2016.
European Patent Office Provision of the minutes in accordance with Rule 124(4) EPC for Application No. 13 197 468.5-1958, dated Mar. 4, 2016.
Korean Intellectual Property Office Notice of Allowance for Patent Application No. 10-2015-7020901 (with translation), dated Dec. 21, 2016.
JP Office Action received from JPO for Patent Application No. 2017-215573. (with English Translation), dated Oct. 2, 2018.
KOHYAMA, PARTs: A machine translation system by composing dependency units, IEICE Technical Report, The Institute for Electronics, Information and Communication Engineers, Japan, Mar. 18, 1991, vol. 90, No. 482, pp. 9-16.
ITOH, Full text database search system—'Kenzo-lcun' (1), Abstract of the $41^{st}$ ($2^{nd}$ half of 1990) National convention (the $2^{nd}$ half of 1990), Information Processing Society of Japan, Japan, Sep. 6, 1990, pp. 4-144 to pp. 4-145, 1F-8.
AU Office Action received for Patent Application No. 2017276234, dated Jan. 7, 2019.

* cited by examiner

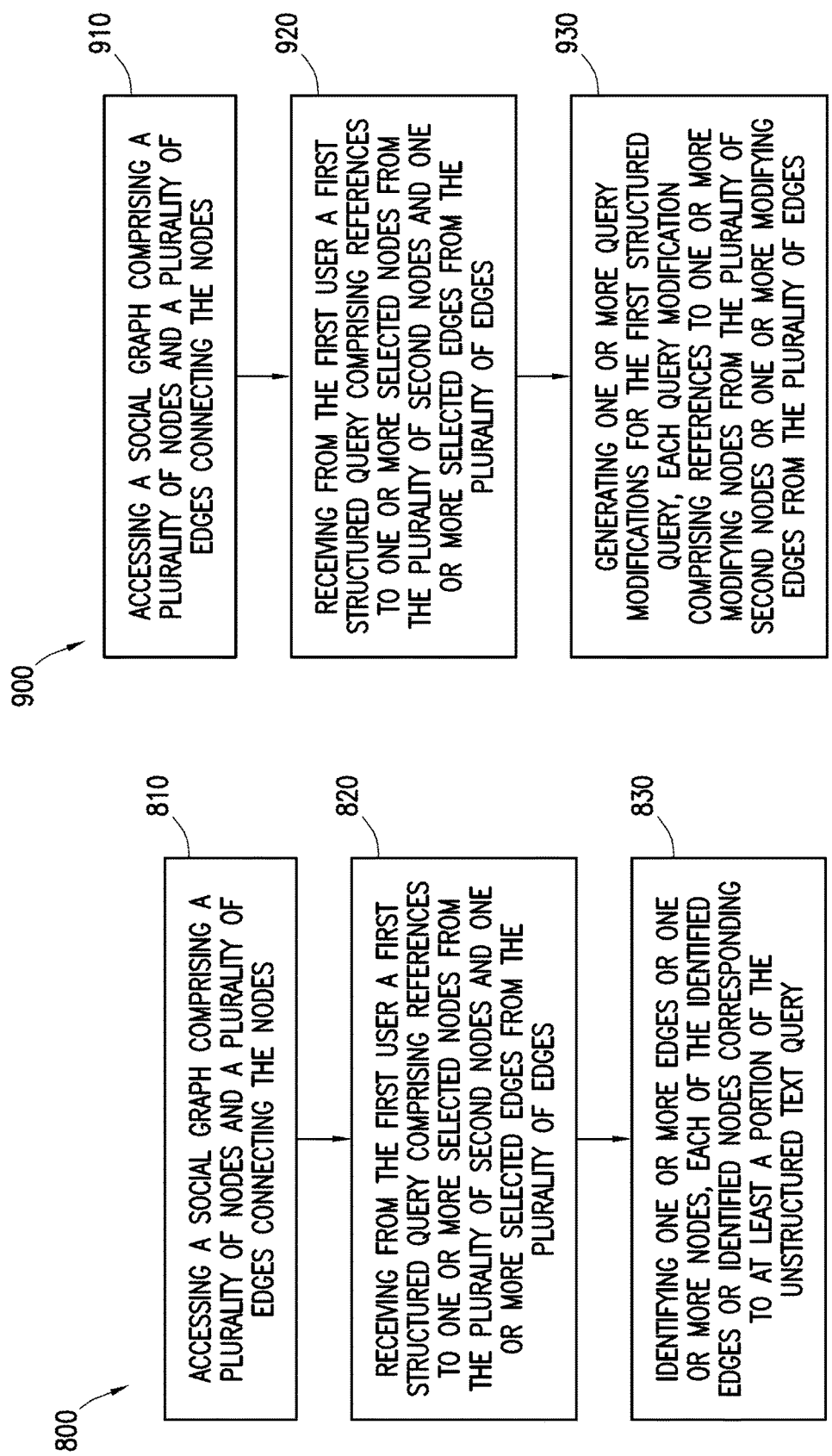

NATURAL-LANGUAGE RENDERING OF STRUCTURED SEARCH QUERIES

PRIORITY

This application is a continuation under 35 U.S.C. § 120 of U.S. patent application Ser. No. 13/731,866, filed 31 Dec. 2012.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, in response to a text query received from a user, a social-networking system may generate structured queries comprising query tokens that correspond to identified social-graph elements. By providing suggested structured queries in response to a user's text query, the social-networking system may provide a powerful way for users of an online social network to search for elements represented in a social graph based on their social-graph attributes and their relation to various social-graph elements.

In particular embodiments, the social-networking system may receive an unstructured text query from a user. In response, the social-networking system may access a social graph and then parse the text query to identify social-graph elements that corresponded to n-grams from the text query. The social-networking system may then access a grammar model, such as a context-free grammar model. The identified social-graph elements may be used as terminal tokens ("query tokens") in the grammars of the grammar model. Any grammar that can utilize all of the identified query tokens may be selected. These grammars may be identified by first generating a semantic tree corresponding to the text query, and then analyzing a grammar forest to find sub-trees that match the semantic tree. The selected grammars may then be used to generate natural-language structured queries that include query tokens referencing the identified social-graph elements. The structured queries may then be transmitted and displayed to the user, where the user can then select an appropriate query to search for the desired content.

In particular embodiments, in response to a structured query, the social-networking system may generate one or more search results corresponding to the structured query. These search results may be transmitted to the querying user as part of a search-results page. Each search result may include one or more snippets, where the snippet may be contextual information about social-graph entity that corresponds to the search result. For example, a snippet may be information from the profile page associated with a node. Each search result may also include at least one snippet providing social-graph information for the search result. These snippets may contain references to the query tokens from the structured query used to generate the search result.

In particular embodiments, in response to a structured query, the social-networking system may generate one or more query modifications for the structured query. Each query modification may include references to modified nodes or modified edges from the social graph, which may be used to add or replace query tokens in the structured query. The query modifications may be displayed on the search-results page, allowing a user to view the search results and then select one or more query modifications to refine or pivot the structured query and generate new search results. After modifying a structured query with a particular query modification, an appropriate grammar may be used to generate a new natural-language structured query that includes reference to the social-graph elements used in the query modification. The social-networking system may also generate alternative structured queries that may be displayed on the search-results page. These alternative structured queries include suggested queries, broadening queries, and disambiguation queries.

BRIEF DESCRIPTION OF THE DRAWINGS

FIGS. 7A-7G illustrate example search-results pages.

FIG. 8 illustrates an example method for generating search results and snippets.

FIG. 9 illustrates an example method for modifying structured search queries.

DESCRIPTION OF EXAMPLE EMBODIMENTS

System Overview

Figure 1:
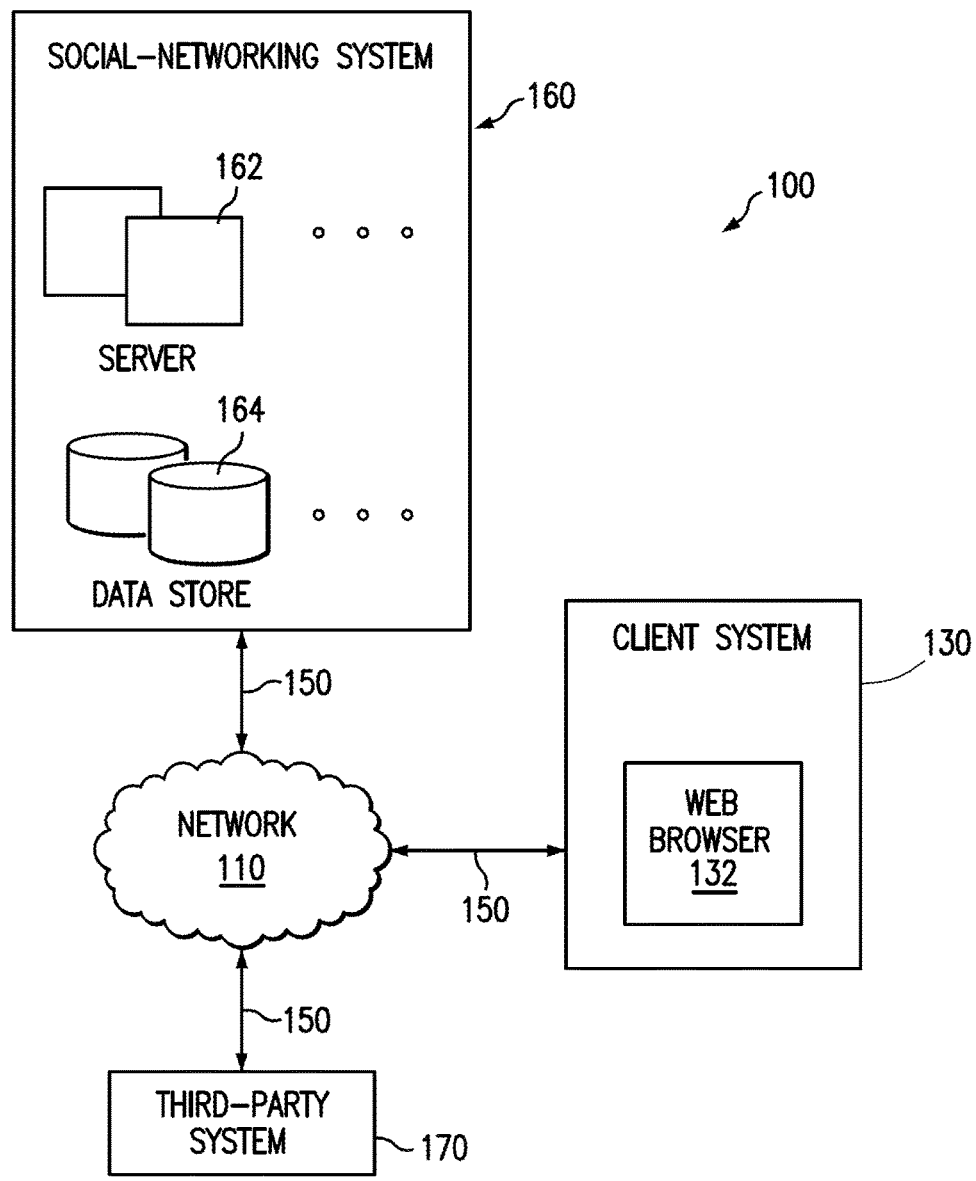
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database.

Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
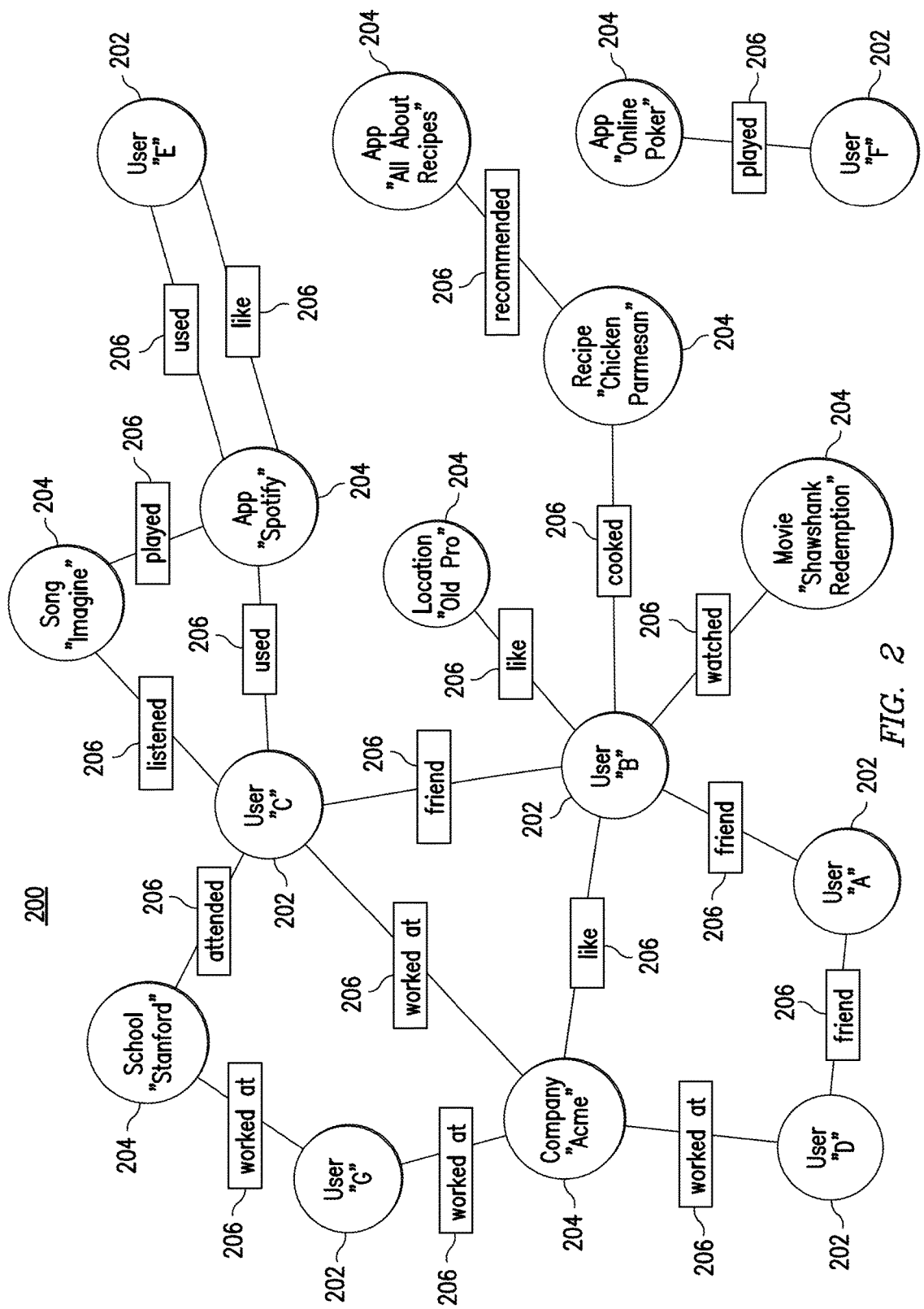
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat"

edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user). In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user. As an example and not by way of limitation, advertisements may be included among the search results of a search-results page, where sponsored content is promoted over non-sponsored content. As another example and not by way of limitation, advertisements may be included among suggested search query, where suggested queries that reference the advertiser or its content/products may be promoted over non-sponsored queries.

An advertisement may include social-networking-system functionality that a user may interact with. For example, an advertisement may enable a user to "like" or otherwise endorse the advertisement by selecting an icon or link associated with endorsement. As another example, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may transmit the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also transmit before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may transmit a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 3:
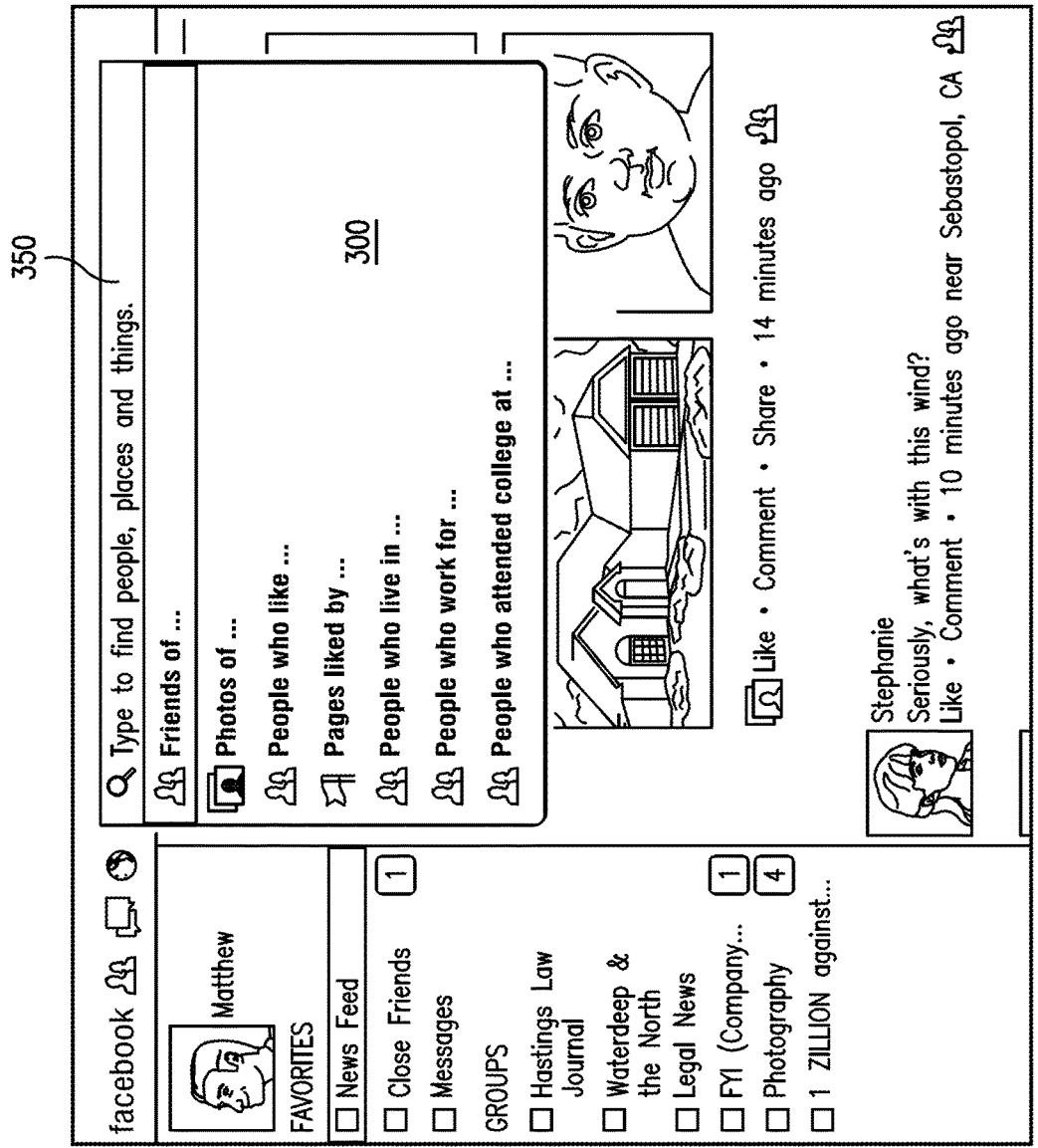
FIG. 3 illustrates an example webpage of an online social network.

FIG. 3 illustrates an example webpage of an online social network. In particular embodiments, a user may submit a query to the social-network system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or transmit a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results webpage with search results corresponding to the identified content and transmit the search-results webpage to the user. The search results may be presented to the user, often in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The social-networking system 160 may then transmit the search-results webpage to the web browser 132 on the user's client system 130. The user may then click on the URL links or otherwise select the content from the search-results webpage to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a search field, a typeahead process may attempt to identify one or more user nodes 202, concept nodes 204, or edges 206 that match the string of characters entered search field as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may transmit a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may transmit a request that informs the social-networking system 160 of the user's confirmation of a query containing the matching social-graph elements. In response to the request transmitted, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Natural-Language Rendering of Structured Search Queries

Figure 4A:
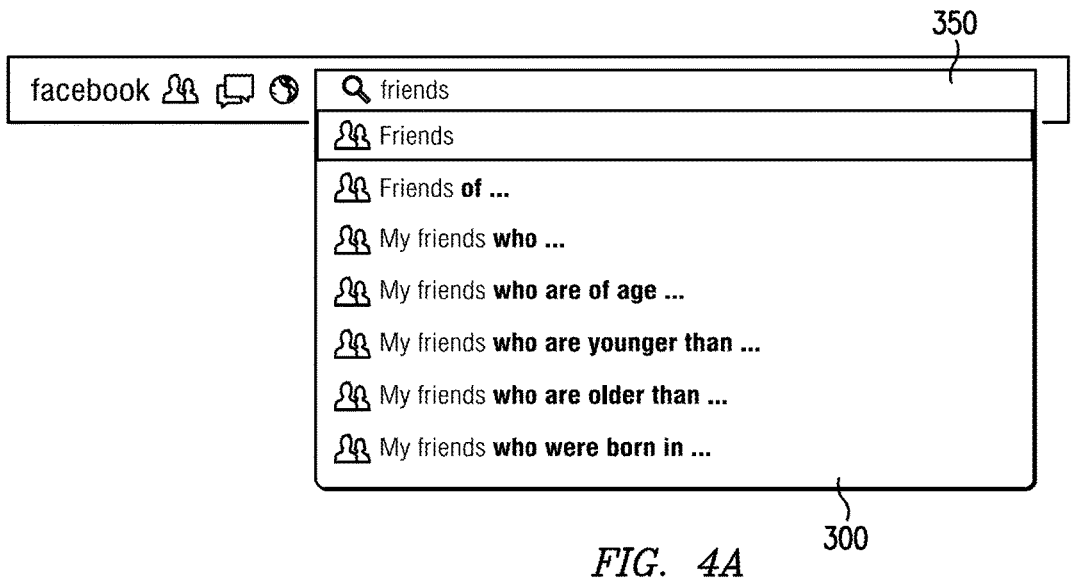
FIGS. 4A-4B illustrate example queries of the social network.
Figure 4B:
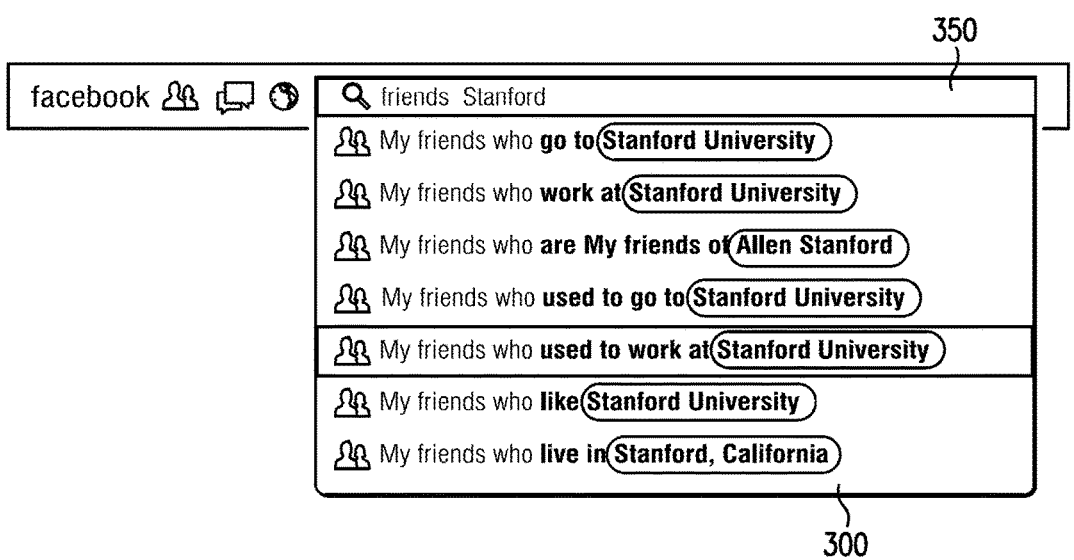

FIGS. 4A-4B illustrate example queries of the social network. In particular embodiments, in response to a text query received from a first user (i.e., the querying user), the social-networking system 160 may generate one or more structured queries rendered in a natural-language syntax, where each structured query includes query tokens that correspond to one or more identified social-graph elements. FIGS. 4A-4B illustrate various example text queries in query field 350 and various structured queries generated in response in drop-down menus 300. By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge types. As an example and not by way of limitation, the social-networking system 160 may receive an unstructured text query from a first user. In response, the social-networking system 160 (via, for example, a server-side element detection process) may access the social graph 200 and then parse the text query to identify social-graph elements that corresponded to n-grams from the text query. The social-networking system 160 may then access a grammar model, such as a context-free grammar model, which includes a plurality of grammars. These grammars may be visualized as a grammar forest that is organized as an ordered tree with a plurality of non-terminal and terminal tokens. The identified social-graph elements may be used as terminal tokens ("query tokens") in the grammars. Once these terminal tokens have been identified (for example, by using a semantic tree that corresponds to the text query from the user), the social-networking system 160 may traverse the grammar forest to identify intersecting non-terminal nodes. Each grammar represented by one of these intersecting non-terminal nodes may then be selected. The selected grammars may then be used to generate one or more structured queries that include the query tokens referencing the identified social-graph elements. These structured queries may be based on strings generated by the grammars, such that they are rendered with references to the appropriate social-graph elements using a natural-language syntax. The structured queries may be transmitted to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. By using this process, the output of the natural-language rendering process may be efficiently parsed, for example, to generate modified or alternative structured queries. Furthermore, since the rules used by this process are derived from the grammar model, any modification to the rules of the grammar model can be immediately reflected in the rendering process. Although this disclosure describes and FIGS. 4A-4B illustrate generating particular structured queries in a particular manner, this disclosure contemplates generating any suitable structured queries in any suitable manner.

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 4A-4B. As the first user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine. Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, the social-networking system 160 may parse the text query "friends stanford" to identify the following n-grams: friends; stanford; friends stanford. As another example and not by way of limitation, the social-networking system 160 may parse the text query "friends in palo alto" to identify the following n-grams: friends; in; palo; alto; friends in; in palo; palo alto; friend in palo; in palo also; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In particular embodiments, social-networking system 160 may determine or calculate, for each n-gram identified in the text query, a score that the n-gram corresponds to a social-graph element. The score may be, for example, a confidence score, a probability, a quality, a ranking, another suitable type of score, or any combination thereof. As an example and not by way of limitation, the social-networking system 160 may determine a probability score (also referred to simply as a "probability") that the n-gram corresponds to a social-graph element, such as a user node 202, a concept node 204, or an edge 206 of social graph 200. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the social-networking system 160 may determine a probability, p, that an n-gram corresponds to a particular social-graph element. The probability, p, may be calculated as the probability of corresponding to a particular social-graph element, k, given a particular search query, X. In other words, the probability may be calculated as p=(k|X). As an example and not by way of limitation, a probability that an n-gram corresponds to a social-graph element may calculated as an probability score denoted as $p_{i,j,k}$. The input may be a text query X=($x_1, x_2, \ldots, x_N$), and a set of classes. For each (i:j) and a class k, the social-networking system 160 may compute $p_{i,j,k}$=p(class($x_{i:j}$)=k|X). As an example and not by way of limitation, the n-gram "stanford" could be scored with respect to the following social-graph elements as follows: school "Stanford University"=0.7; location "Stanford, Calif."=0.2; user "Allen Stanford"=0.1. As another example and not by way of limitation, the n-gram "friends" could be scored with respect to the following social-graph elements as follows: user "friends"=0.9; television show "Friends"=0.1. In particular embodiments, the social-networking system 160 may user a forward-backward algorithm to determine the probability that a particular n-gram corresponds to a particular social-graph element. For a given n-gram within a text query, the social-networking system 160 may use both the preceding and succeeding n-grams to determine which particular social-graph elements correspond to the given n-gram. In particular embodiments, the identified social-graph elements may be used to generate a query command that is executable by a search engine. The query command may be a structured semantic query with defined functions that accept specific arguments. As an example and not by way of limitation, the text query "friend me mark" could be parsed to form the query command: intersect(friend(me), friend(Mark)). In other words, the query is looking for nodes in the social graph that intersect the querying user ("me") and the user "Mark" (i.e., those user nodes 202 that are connected to both the user node 202 of the querying user by a friend-type edge 206 and the user node 202 for the user "Mark" by a friend-type edge 206). Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

In particular embodiments, social-networking system 160 may identify one or more edges 206 having a probability greater than an edge-threshold probability. Each of the identified edges 206 may correspond to at least one of the n-grams. As an example and not by way of limitation, the n-gram may only be identified as corresponding to an edge, k, if $p_{i,j,k} > p_{edge-threshold}$. Furthermore, each of the identified edges 206 may be connected to at least one of the identified nodes. In other words, the social-networking system 160 may only identify edges 206 or edge-types that are connected to user nodes 202 or concept nodes 204 that have previously been identified as corresponding to a particular n-gram. Edges 206 or edge-types that are not connected to any previously identified node are typically unlikely to correspond to a particular n-gram in a search query. By filtering out or ignoring these edges 206 and edge-types, the social-networking system 160 may more efficiently search the social graph 200 for relevant social-graph elements. As an example and not by way of limitation, referencing FIG. 2, for a text query containing "went to Stanford," where an identified concept node 204 is the school "Stanford," the social-networking system 160 may identify the edges 206 corresponding to "worked at" and the edges 206 corresponding to "attended," both of which are connected to the concept node 204 for "Stanford." Thus, the n-gram "went to" may be identified as corresponding to these edges 206. However, for the same text query, the social-networking system 160 may not identify the edges 206 corresponding to "like" or "fan" in the social graph 200 because the "Stanford" node does not have any such edges connected to it. Although this disclosure describes identifying edges 206 that correspond to n-grams in a particular manner, this disclosure contemplates identifying edges 206 that correspond to n-grams in any suitable manner.

In particular embodiments, social-networking system 160 may identify one or more user nodes 202 or concept nodes 204 having a probability greater than a node-threshold probability. Each of the identified nodes may correspond to at least one of the n-grams. As an example and not by way of limitation, the n-gram may only be identified as corresponding to a node, k, if $p_{i,j,k} > p_{node-threshold}$. Furthermore, each of the identified user nodes 202 or concept nodes 204 may be connected to at least one of the identified edges 206. In other words, the social-networking system 160 may only identify nodes or nodes-types that are connected to edges 206 that have previously been identified as corresponding to a particular n-gram. Nodes or node-types that are not connected to any previously identified edges 206 are typically unlikely to correspond to a particular n-gram in a search query. By filtering out or ignoring these nodes and node-types, the social-networking system 160 may more efficiently search the social graph 200 for relevant social-graph elements. As an example and not by way of limitation, for a text query containing "worked at Apple," where an identified edge 206 is "worked at," the social-networking system 160 may identify the concept node 204 corresponding to the company APPLE, INC., which may have multiple edges 206 of "worked at" connected to it. However, for the same text query, the social-networking system 160 may not identify the concept node 204 corresponding to the fruit-type "apple," which may have multiple "like" or "fan" edges connected to it, but no "worked at" edge connections. In particular embodiments, the node-threshold probability may differ for user nodes 202 and concept nodes 204, and may differ even among these nodes (e.g., some concept nodes 204 may have different node-threshold probabilities than other concept nodes 204). As an example and not by way of limitation, an n-gram may be identified as corresponding to a user node 302, $k_{user}$, if $p_{i,j,k} > p_{user-node-threshold}$, while an n-gram may be identified as corresponding to a concept node 304, $k_{concept}$ if $p_{i,j,k} > p_{concept-node-threshold}$. In particular embodiments, the social-networking system 160 may only identify nodes that are within a threshold degree of separation of the user node 202 corresponding to the first user (i.e., the querying user). The threshold degree of separation may be, for example, one, two, three, or all. Although this disclosure describes identifying nodes that correspond to n-grams in a particular manner, this disclosure contemplates identifying nodes that correspond to n-grams in any suitable manner.

In particular embodiments, the social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. In particular embodiments, the plurality of grammars may be visualized as a grammar forest organized as an ordered tree, with the internal nodes corresponding to non-terminal tokens and the leaf nodes corresponding to terminal tokens. Each grammar may be represented as a sub-tree within the grammar forest, where the grammars are adjoining each other via non-terminal tokens. Thus, two or more grammars may be a sub-forest within the grammar forest. Although this disclosure describes accessing particular grammars, this disclosure contemplates any suitable grammars.

In particular embodiments, the social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $(\Sigma, N, S, P)$, where the disjoint sets $\Sigma$ and $N$ specify the terminal and non-terminal symbols, respectively, with $S \in N$ being the start symbol. P is the set of productions, which take the form $E \rightarrow \xi(p)$, with $E \in N$, $\xi \in (\Sigma \cup N)^+$, and $p=Pr(E \rightarrow \xi)$, the probability that E will be expanded into the string $\xi$. The sum of probabilities p over all expansions of a given non-terminal E must be one. Although this disclosure describes generating strings in a particular manner, this disclosure contemplates generating strings in any suitable manner.

In particular embodiments, the social-networking system 160 may identify one or more query tokens corresponding to the previously identified nodes and edges. In other words, if an identified node or identified edge may be used as a query token in a particular grammar, that query token may be identified by the social-networking system 160. As an example and not by way of limitation, an example grammar may be: [user][user-filter][school]. The non-terminal symbols [user], [user-filter], and [school] could then be determined based n-grams in the received text query. For the text query "friends stanford", this query could be parsed by using the grammar as, for example, "[friends][who go to][Stanford University]" or "[friends][who work at][Stanford University]". As another example and not by way of limitation, an example grammar may be [user][user-filter][location]. For the text query "friends stanford", this query could be parsed by using the grammar as, for example, "[friends][who live in][Stanford, Calif.]". In both the example cases above, if the n-grams of the received text query could be used as query tokens, then these query tokens may be identified by the social-networking system 160. Although this disclosure describes identifying particular query tokens in a particular manner, this disclosure contemplates identifying any suitable query tokens in any suitable manner.

In particular embodiments, the social-networking system 160 may select one or more grammars having at least one query token corresponding to each of the previously identified nodes and edges. Only particular grammars may be used depending on the n-grams identified in the text query. So the terminal tokens of all available grammars should be examined to find those that match the identified n-grams from the text query. In other words, if a particular grammar can use all of the identified nodes and edges as query tokens, that grammar may be selected by the social-networking system 160 as a possible grammar to use for generating a structured query. This is effectively a type of bottom-up parsing, where the possible query tokens are used to determine the applicable grammar to apply to the query. As an example and not by way of limitation, for the text query "friends stanford", the social-networking system may identify the query tokens of [friends] and [Stanford University]. Terminal tokens of the grammars from the grammar model may be identified, as previously discussed. Any grammar that is able to use both the [friends] and the [Stanford University] tokens may then be selected. For example, the grammar [user][user-filter][school] may be selected because this grammar could use the [friends] and the [Stanford University] tokens as query tokens, such as by forming the strings "friends who go to Stanford University" or "friends who work at Stanford University". Thus, if the n-grams of the received text query could be used as query tokens in the grammars, then these grammars may be selected by the social-networking system 160. Similarly, if the received text query comprises n-grams that could not be used as query tokens in the grammar, that grammar may not be selected. Although this disclosure describes selecting particular grammars in a particular manner, this disclosure contemplates selecting any suitable grammars in any suitable manner.

In particular embodiments, the social-networking system 160 may select one or more grammars by analyzing a grammar forest formed by a plurality of grammars. The grammar forest may be organized as an ordered tree comprising a plurality of non-terminal tokens and a plurality of terminal tokens. Each grammar may be represented as a sub-tree within the grammar forest, and each sub-tree may adjoin other sub-trees via one or more additional non-terminal tokens. As an example and not by way of limitation, the social-networking system 160 may start by identifying all the terminal tokens (i.e., query tokens) in the grammar forest that correspond to identified nodes and edges corresponding to portions of a text query. Once these query tokens in the grammar forest have been identified, the social-networking system 160 may then traverse the grammar forest up from each of these query tokens to identify one or more intersecting non-terminal tokens. Once a non-terminal token has been identified where paths from all the query tokens intersect, that intersecting non-terminal token may be selected, and the one or more grammars adjoined to that intersecting non-terminal token in the grammar forest may then be selected. Although this disclosure describes selecting grammars in a particular manner, this disclosure contemplates selecting grammars in any suitable manner.

Figure 5A:
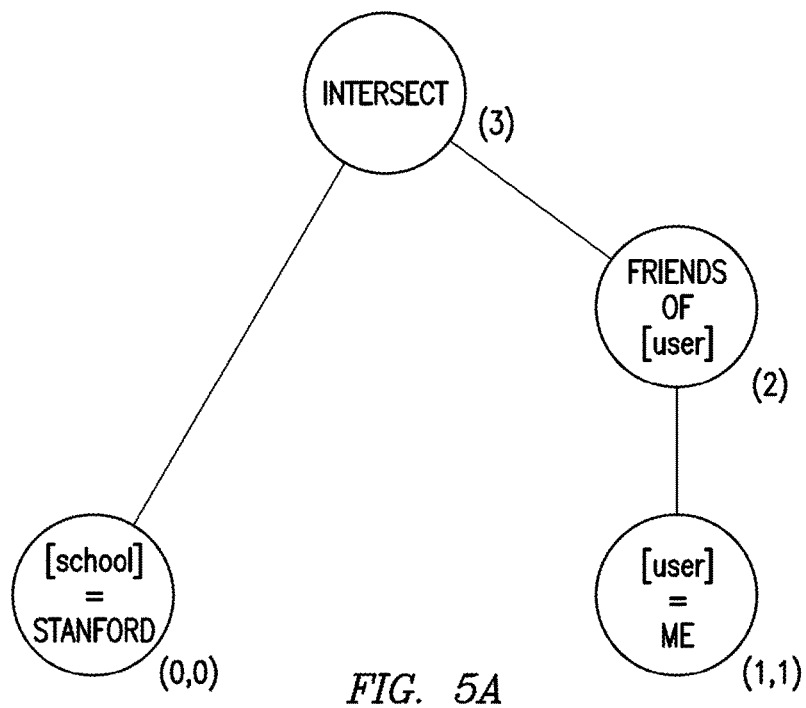
FIG. 5A illustrates an example semantic tree

FIG. 5A illustrates an example semantic tree. In particular embodiments, the social-networking system 160 may generate a semantic tree corresponding to the text query from the querying user. The semantic tree may include each identified query token that corresponds to a previously identified node or edge, and may also include an intersect token. The semantic tree may also include non-terminal tokens as appropriate connecting the query tokens to the intersect token. As an example and not by way of limitation, the text query "friends stanford" may be parsed into the query command: intersect(school(Stanford University), friends(me)). In other words, the query is looking for nodes in the social graph that intersect both friends of the querying user ("me") (i.e., those user nodes 202 that are connected to the user node 202 of the querying user by a friend-type edge 206) and the concept node 204 for Stanford University. This may be represented as the semantic tree illustrated in FIG. 5A, which includes the terminal tokens for the querying user [me], and the school [Stanford], a non-terminal token for [friends of [user]], and an intersect token. In particular embodiments, each token in the tree may be labeled in the order it will be processed. For example, the semantic tree illustrated in FIG. 5A has tokens labeled using a postfix notation, with the token for [Stanford] labeled as (0,0), the token for [me] labeled as (1,1), the [friends of [user]] token labeled (2), and the intersect token labeled (3). Although this disclosure describes generating particular semantic trees in a particular manner, this disclosure contemplates generating any suitable semantic trees in any suitable manner.

Figure 5B:
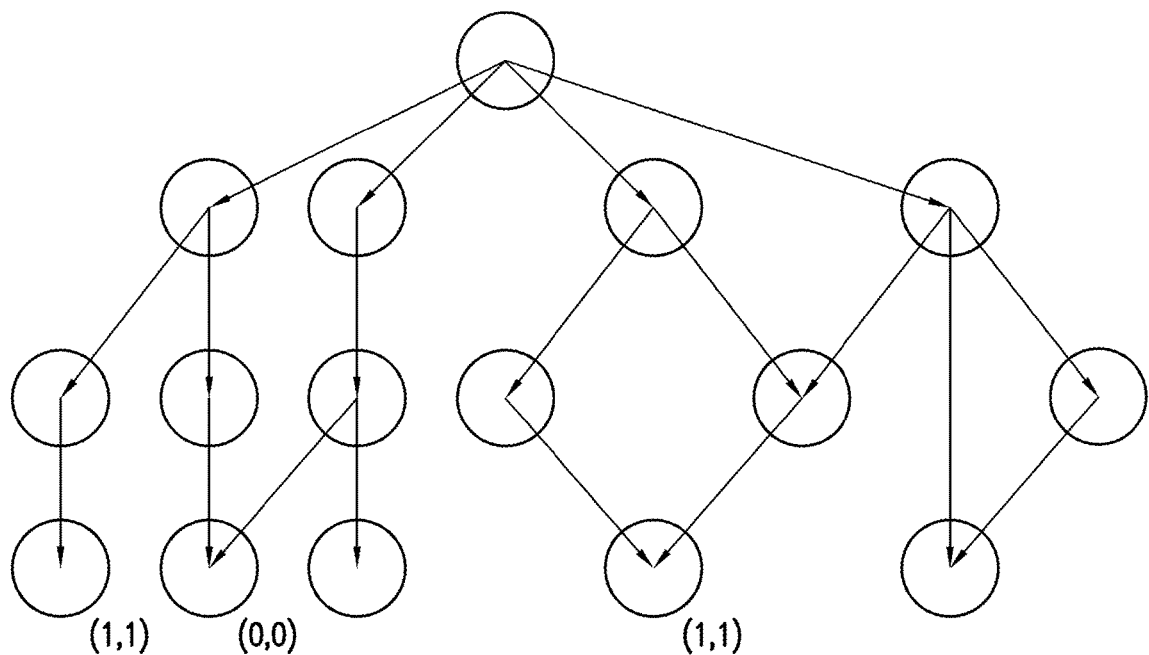
FIG. 5B illustrates an example grammar forest.

FIG. 5B illustrates an example grammar forest. In particular embodiments, the social-networking system 160 may analyze a grammar forest comprising a plurality of grammars to identify one or more sets of non-terminal tokens and query tokens that substantially match a semantic tree corresponding to a query, where each set has a non-terminal token corresponding to the intersect token of the semantic tree. The social-networking system 160 may then select one or more of the grammars in the grammar forest adjoining the non-terminal token corresponding to the intersect token. Each selected intersecting non-terminal token from the grammar forest may then be labeled as a [start] token for a grammar. As an example and not by way of limitation, the following algorithm may be used to traverse the grammar forest to identify an intersecting token:

for each terminal token (i,i) in a semantic tree, label each matching terminal token in the grammar forest (i,i).
for i=0 to size(semantic tree−1):
  for j=i to 0:
    expand all tokens labeled (i,j).
expand (i,j):
  for all tokens in the grammar forest:
    if token has a rule with 1 argument that grows sub-tree to (i',j'), then label token as (i',j');
    if token has a rule with more than 1 argument that might grow the sub-tree, label token as "waiting";
    if token is labeled "waiting", and now can grow sub-tree to (i',j'), then label token as (i',j').

Thus, for example, in the example illustrated in FIG. 5B, all terminal tokens that match terminal tokens (0,0) and (1,1) from the semantic tree illustrated in FIG. 5A will be labeled as (0,0) and (1,1), respectively. Then, from each valid token in the grammar forest, the social-networking system 160 may traverse to parent tokens to see if a sub-tree can be formed that matches the semantic tree. If the parent non-terminal token has a matching semantic, that non-terminal token may be labeled using the same label as the corresponding token from the semantic tree. In the example illustrated in FIG. 5B, as the grammar forest is traversed from one of the tokens labeled (1,1), once a non-terminal token matching the semantic [friends of [user]] is found, that token may be labeled (2), so it matches the semantic tree. A parent of this token may then be labeled as "waiting" since it is a potential intersect token. However, if the traverse cannot find any parent tokens that match the semantic of the semantic tree, then that particular traverse may be terminated. Once one branch of the traverse has reached a potential intersect token, that token may be labeled as "waiting", while the algorithm proceeds with traverses from other valid terminal tokens (e.g., the traverse from terminal tokens labeled (0,0)). Alternatively, if a traverse finds a token that has already been labeled as "waiting," that token may be identified as an intersect token and labeled (3). Each token labeled (3) may then be selected as a grammar, which may be used to generate a natural-language string for a structured query. The algorithm will attempt to find the lowest-cost multi-path in the grammar forest that leads to an intersect token, and the intersect token corresponding to this lowest-cost multi-path may be preferentially selected over other intersect tokens (if any). Although this disclosure describes analyzing particular grammar forests in a particular manner, this disclosure contemplates analyzing any suitable grammar forests in any suitable manner.

In particular embodiments, the social-networking system 160 may determine a score for each selected grammar. The score may be, for example, a confidence score, a probability, a quality, a ranking, another suitable type of score, or any combination thereof. The score may be based on the individual scores or probabilities associated with the query tokens used in the selected grammar. A grammar may have a higher relative score if it uses query tokens with relatively higher individual scores. As an example and not by way of limitation, continuing with the prior examples, the n-gram "stanford" could be scored with respect to the following social-graph elements as follows: school "Stanford University"=0.7; location "Stanford, Calif."=0.2; user "Allen Stanford"=0.1. The n-gram "friends" could be scored with respect to the following social-graph elements as follows:

user "friends"=0.9; television show "Friends"=0.1. Thus, the grammar [user][user-filter][school] may have a relatively high score if it uses the query tokens for the user "friends" and the school "Stanford University" (generating, for example, the string "friends who go to Stanford University"), both of which have relatively high individual scores. In contrast, the grammar [user][user-filter][user] may have relatively low score if it uses the query tokens for the user "friends" and the user "Allen Stanford" (generating, for example, the string "friends of Allen Stanford"), since the latter query token has a relatively low individual score. In particular embodiments, the social-networking system 160 may determine a score for a selected grammar based on the lengths of the paths traversed in order to identify the intersect token corresponding to the selected grammar. Grammars with lower-cost multi-paths (i.e., shorter paths) may be scored more highly than grammars with high-cost multi-paths (i.e., longer paths). In particular embodiments, the social-networking system 160 may determine a score for a selected grammar based on advertising sponsorship. An advertiser (such as, for example, the user or administrator of a particular profile page corresponding to a particular node) may sponsor a particular node such that a grammar that includes a query token referencing that sponsored node may be scored more highly. Although this disclosure describes determining particular scores for particular grammars in a particular manner, this disclosure contemplates determining any suitable scores for any suitable grammars in any suitable manner.

In particular embodiments, the social-networking system 160 may determine the score for a selected grammar based on the relevance of the social-graph elements corresponding to the query tokens of the grammar to the querying user (i.e., the first user, corresponding to a first user node 202). User nodes 202 and concept nodes 204 that are connected to the first user node 202 directly by an edge 206 may be considered relevant to the first user. Thus, grammars comprising query tokens corresponding to these relevant nodes and edges may be considered more relevant to the querying user. As an example and not by way of limitation, a concept node 204 connected by an edge 206 to a first user node 202 may be considered relevant to the first user node 202. As used herein, when referencing a social graph 200 the term "connected" means a path exists within the social graph 200 between two nodes, wherein the path may comprise one or more edges 206 and zero or more intermediary nodes. In particular embodiments, nodes that are connected to the first user node 202 via one or more intervening nodes (and therefore two or more edges 206) may also be considered relevant to the first user. Furthermore, in particular embodiments, the closer the second node is to the first user node, the more relevant the second node may be considered to the first user node. That is, the fewer edges 206 separating the first user node 202 from a particular user node 202 or concept node 204 (i.e., the fewer degrees of separation), the more relevant that user node 202 or concept node 204 may be considered to the first user. As an example and not by way of limitation, as illustrated in FIG. 2, the concept node 204 corresponding to the school "Stanford" is connected to the user node 202 corresponding to User "C," and thus the concept "Stanford" may be considered relevant to User "C." As another example and not by way of limitation, the user node 202 corresponding to User "A" is connected to the user node 202 corresponding to User "C" via one intermediate node and two edges 206 (i.e., the intermediated user node 202 corresponding to User "B"), and thus User "A" may be considered relevant to User "C," but because the user node 202 for User "A" is a second-degree connection with respect to User "C," that particular concept node 204 may be considered less relevant than a user node 202 that is connected to the user node for User "C" by a single edge 206, such as, for example, the user node 202 corresponding to User "B." As yet another example and not by way of limitation, the concept node for "Online Poker" (which may correspond to an online multiplayer game) is not connected to the user node for User "C" by any pathway in social graph 200, and thus the concept "Online Poker" may not be considered relevant to User "C." In particular embodiments, a second node may only be considered relevant to the first user if the second node is within a threshold degree of separation of the first user node 202. As an example and not by way of limitation, if the threshold degree of separation is three, then the user node 202 corresponding to User "D" may be considered relevant to the concept node 204 corresponding to the recipe "Chicken Parmesan," which are within three degrees of each other on social graph 200 illustrated in FIG. 2. However, continuing with this example, the concept node 204 corresponding to the application "All About Recipes" would not be considered relevant to the user node 202 corresponding to User "D" because these nodes are four degrees apart in the social graph 200. Although this disclosure describes determining whether particular social-graph elements (and thus their corresponding query tokens) are relevant to each other in a particular manner, this disclosure contemplates determining whether any suitable social-graph elements are relevant to each other in any suitable manner. Moreover, although this disclosure describes determining whether particular query tokens corresponding to user nodes 202 and concept nodes 204 are relevant to a querying user, this disclosure contemplates similarly determining whether any suitable query token (and thus any suitable node) is relevant to any other suitable user.

In particular embodiments, the social-networking system 160 may determine the score for a selected grammar based social-graph information corresponding to the query tokens of the grammar. As an example and not by way of limitation, when determining a probability, p, that an n-gram corresponds to a particular social-graph element, the calculation of the probability may also factor in social-graph information. Thus, the probability of corresponding to a particular social-graph element, k, given a particular search query, X, and social-graph information, G, may be calculated as $p=(k|X,G)$. The individual probabilities for the identified nodes and edges may then be used to determine the score for a grammar using those social-graph elements as query tokens. In particular embodiments, the score for a selected grammar may be based on the degree of separation between the first user node 202 and the particular social-graph element used as a query token in the grammar. Grammars with query tokens corresponding to social-graph elements that are closer in the social graph 200 to the querying user (i.e., fewer degrees of separation between the element and the first user node 202) may be scored more highly than grammars using query tokens corresponding to social-graph elements that are further from the user (i.e., more degrees of separation). As an example and not by way of limitation, referencing FIG. 2, if user "B" inputs a text query of "chicken," a grammar with a query token corresponding to the concept node 204 for the recipe "Chicken Parmesan," which is connected to user "B" by an edge 206, may have a relatively higher score than a grammar with a query token corresponding to other nodes associated with the n-gram chicken (e.g., concept nodes 204 corresponding to "chicken nuggets," or "funky chicken dance") that are not connected to user "B" in the social graph 200. In particular embodiments, the score for a selected grammar may be based on the identified edges 206 corresponding to the query tokens of the grammar. If the social-networking system 160 has already identified one or more edges that correspond to n-grams in a received text query, those identified edges may then be considered when determining the score for a particular parsing of the text query by the grammar. If a particular grammar comprises query tokens that correspond to both identified nodes and identified edges, if the identified nodes are not actually connected to any of the identified edges, that particular grammar may be assigned a zero or null score. In particular embodiments, the score for a selected grammar may be based on the number of edges 206 connected to the nodes corresponding to query tokens of the grammar. Grammars comprising query tokens that corresponding to nodes with more connecting edges 206 may be more popular and more likely to be a target of a search query. As an example and not by way of limitation, if the concept node 204 for "Stanford, Calif." is only connected by five edges while the concept node 204 for "Stanford University" is connected by five-thousand edges, when determining the score for grammars containing query tokens corresponding to either of these nodes, the social-networking system 160 may determine that the grammar with a query token corresponding to the concept node 204 for "Stanford University" has a relatively higher score than a grammar referencing the concept node 204 for "Stanford, Calif." because of the greater number of edges connected to the former concept node 204. In particular embodiments, the score for a selected grammar may be based on the search history associate with the first user (i.e., the querying user). Grammars with query tokens corresponding to nodes that the first user has previously accessed, or are relevant to the nodes the first user has previously accessed, may be more likely to be the target of the first user's search query. Thus, these grammars may be given a higher score. As an example and not by way of limitation, if first user has previously visited the "Stanford University" profile page but has never visited the "Stanford, Calif." profile page, when determining the score for grammars with query tokens corresponding to these concepts, the social-networking system 160 may determine that the concept node 204 for "Stanford University" has a relatively high score, and thus the grammar using the corresponding query token, because the querying user has previously accessed the concept node 204 for the school. As another example and not by way of limitation, if the first user has previously visited the concept-profile page for the television show "Friends," when determining the score for the grammar with the query token corresponding to that concept, the social-networking system 160 may determine that the concept node 204 corresponding to the television show "Friends" has a relatively high score, and thus the grammar using the corresponding query token, because the querying user has previously accessed the concept node 204 for that television show. Although this disclosure describes determining scores for particular grammars based on particular social-graph information in a particular manner, this disclosure contemplates determining scores for any suitable grammars based on any suitable social-graph information in any suitable manner.

In particular embodiments, social-networking system 160 may select one or more grammars having a score greater than a grammar-threshold score. Each of the selected grammars may contain query tokens that correspond to each of the identified nodes or identified edges (which correspond to n-grams of the received text query). In particular embodiments, the grammars may be ranked based on their determined scores, and only grammars within a threshold rank may be selected (e.g., top seven). Although this disclosure describes selecting grammars in a particular manner, this disclosure contemplates selecting grammars in any suitable manner.

In particular embodiments, social-networking system 160 may generate one or more structured queries corresponding to the selected grammars (e.g., those grammars having a score greater than a grammar-threshold score). Each structured query may be based on a string generated by the corresponding selected grammar. As an example and not by way of limitation, in response to the text query "friends stanford", the grammar [user][user-filter][school] may generate a string "friends who go to Stanford University", where the non-terminal tokens [user], [user-filter], [school] of the grammar have been replaced by the terminal tokens [friends], [who go to], and [Stanford University], respectively, to generate the string. In particular embodiments, a string that is generated by grammar using a natural-language syntax may be rendered as a structured query in natural language. As an example and not by way of limitation, the structured query from the previous example uses the terminal token [who go to], which uses a natural-language syntax so that the string rendered by grammar is in natural language. The natural-language string generated by a grammar may then be rendered to form a structured query by modifying the query tokens corresponding to social-graph element to include references to those social-graph elements. As an example and not by way of limitation, the string "friends who go to Stanford University" may be rendered so that the query token for "Stanford University" appears in the structured query as a reference to the concept node 204 corresponding to the school "Stanford University", where the reference may be include highlighting, an inline link, a snippet, another suitable reference, or any combination thereof. Each structured query may comprise query tokens corresponding to the corresponding selected grammar, where these query tokens correspond to one or more of the identified edges 206 and one or more of the identified nodes. Generating structured queries is described more below.

In particular embodiments, the social-networking system 160 may generate one or more query modifications for a structured query using a context-free grammar model. Query modifications are discussed more below. A query modification may reference one or more additional nodes or one or more additional edges. This type of query modification may be used to refine or narrow the structured query. Alternatively, a query modification may reference one or more alternate nodes or one or more alternate edges. This type of query modification may be used to pivot or broaden the structured query. Collectively, these may be referred to as modifying nodes and modifying edges, where the modification is to either add or replace a particular query token corresponding to a social-graph element. The references in the query modification to additional or alternate nodes and edges may be used to add or replace query tokens in a structured query, respectively. To identify possible query modifications for a structured query, the social-networking system 160 may identify one or more grammars having query tokens corresponding to the selected nodes and selected edges from the original structured query. In other words, the social-networking system 160 may identify the grammar actually used to generate that particular structured query, other grammars that could have produced that structured query, and grammars that could have that structured query as portion of another structured query. The social-networking system 160 may then identify query tokens in those grammars that may be added or replaced in the structured query. These additional or alternate query tokens may then be used to generate suggested query modifications, which may be transmitted to the querying user as part of a search-results page. The querying user may then select one or more of these query modifications, and in response the social-networking system 160 may generate a new structured query (and corresponding search results). This new structured query may include the modifying query tokens (i.e., additional or alternate query tokens) as appropriate. Although this disclosure describes generating query modifications in a particular manner, this disclosure contemplates generating query modifications in any suitable manner.

Figure 6:
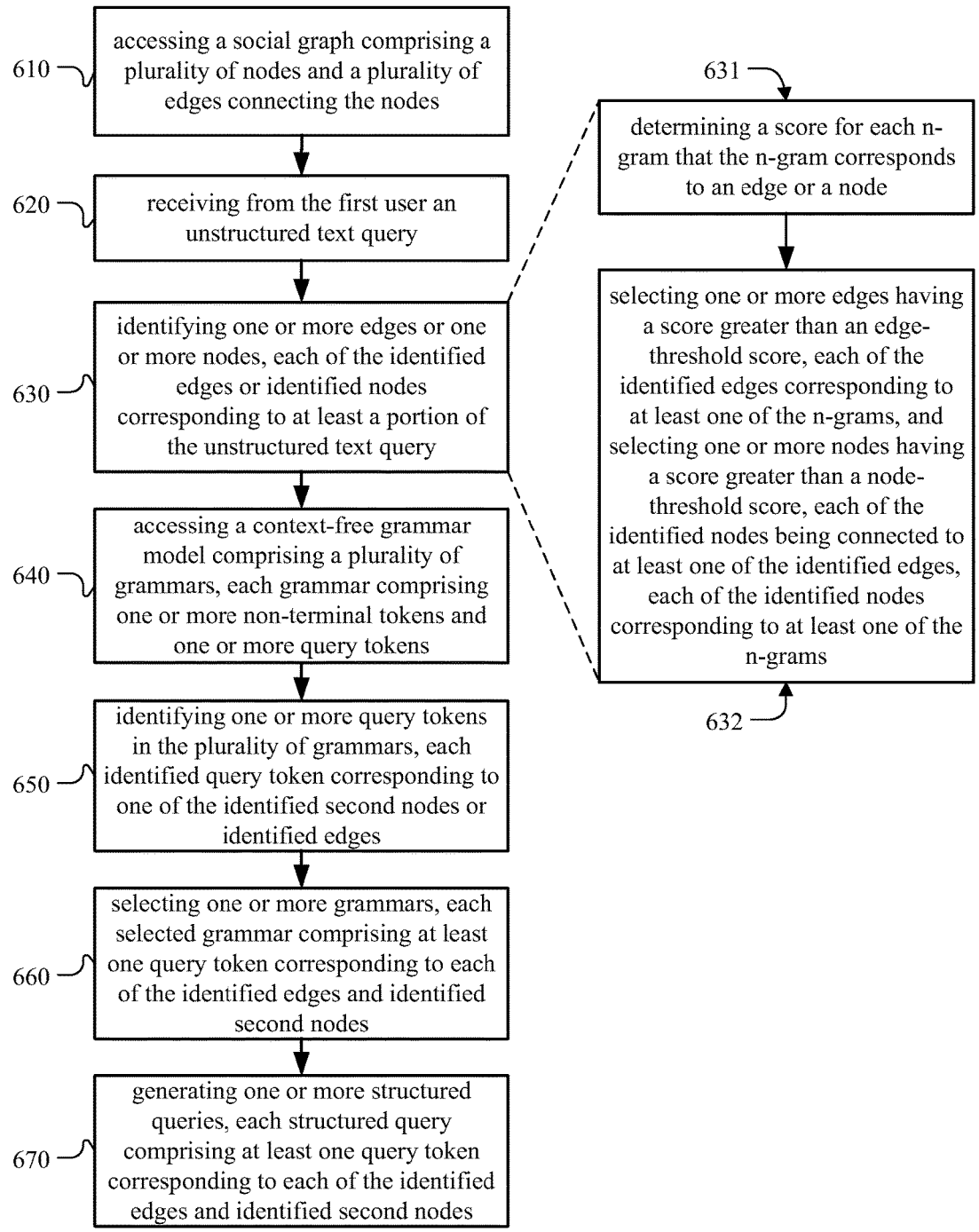
FIG. 6 illustrates an example method for using a context-free grammar model to generate natural-language structured search queries.

FIG. 6 illustrates an example method 600 for using a context-free grammar model to generate natural-language structured search queries. The method may begin at step 610, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 620, the social-networking system 160 may receive from the first user an unstructured text query. The text query may comprise one or more n-grams. At step 630, the social-networking system 160 may identify edges and second nodes corresponding to at least a portion of the unstructured text query. For example, the social-networking system 160 may identify edges and node that correspond to particular n-grams from the query. The social-networking system 160 may identify edges and second nodes by, at step 631, determining a score for each n-gram that the n-gram corresponds to an edge or a second node, and at step 632, selecting one or more edges having a score greater than an edge-threshold score, each of the identified edges corresponding to at least one of the n-grams, and selecting one or more second nodes having a score greater than a node-threshold score, each of the identified second nodes being connected to at least one of the identified edges, each of the identified second nodes corresponding to at least one of the n-grams. At step 640, the social-networking system 160 may access a context-free grammar model comprising a plurality of grammars. Each grammar may comprise one or more non-terminal tokens and one or more query tokens (i.e., terminal tokens). At step 650, the social-networking system 160 may identify one or more query tokens in the plurality of grammars, where each identified query token corresponds to one of the identified nodes or identified edges. At step 660, the social-networking system 160 may select one or more grammars, where each of the selected grammars comprises at least one query token corresponding to each of the identified edges and identified second nodes. At step 670, the social-networking system may generate one or more structured queries based on the selected grammars. Each structured query may correspond to string generated by the selected grammar, which may use a natural-language syntax. Each structured query may included references to each of the identified edges and identified second nodes. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

More information on using grammar models with search queries may be found in U.S. patent application Ser. No. 13/674,695, filed 12 Nov. 2012, which is incorporated by reference.

Generating Structured Search Queries

In particular embodiments, social-networking system 160 may generate one or more structured queries that each comprise the query tokens of the corresponding grammar, where the query tokens may correspond to one or more of the identified user nodes 202 or one or more of the identified edges 206. The generated structured queries may be based on natural-language strings generated by one or more context-free grammars, as described previously. This type of structured search query may allow the social-networking system 160 to more efficiently search for resources and content related to the online social network (such as, for example, profile pages) by searching for content connected to or otherwise related to the identified user nodes 202 and the identified edges 206. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202, while the reference to "friends" would correspond to "friend" edges 206 connecting that user node 202 to other user nodes 202 (i.e., edges 206 connecting to "Stephanie's" first-degree friends). When executing this structured query, the social-networking system 160 may identify one or more user nodes 202 connected by "friend" edges 206 to the user node 202 corresponding to "Stephanie." In particular embodiments, the social-networking system 160 may generate a plurality of structured queries, where the structured queries may comprise references to different identified user nodes 202 or different identified edges 206. As an example and not by way of limitation, in response to the text query, "photos of cat," the social-networking system 160 may generate a first structured query "Photos of Catey" and a second structured query "Photos of Catherine," where "Photos" in the structured query is a reference corresponding to a particular social-graph element, and where "Catey" and "Catherine" are references to two different user nodes 202. Although this disclosure describes generating particular structured queries in a particular manner, this disclosure contemplates generating any suitable structured queries in any suitable manner.

In particular embodiments, social-networking system 160 may generate one or more structured queries that each comprise query tokens corresponding to the identified concept nodes 204 and one or more of the identified edges 206. This type of structured search query may allow the social-networking system 160 to more efficiently search for resources and content related to the online social network (such as, for example, profile pages) by search for content connected to or otherwise related to the identified concept nodes 204 and the identified edges 206. As an example and not by way of limitation, in response to the text query, "friends like facebook," the social-networking system 160 may generate a structured query "My friends who like Facebook," where "friends," "like," and "Facebook" in the structured query are query tokens corresponding to particular social-graph elements as described previously (i.e., a "friend" edge 206, a "like" edge 206, and a "Facebook"

concept node 204). In particular embodiments, the social-networking system 160 may generate a plurality of structured queries, where the structured queries may comprise references to different identified concept nodes 204 or different identified edges 206. As an example and not by way of limitation, continuing with the previous example, in addition to the structured query "My friends who like Facebook," the social-networking system 160 may also generate a structured query "My friends who like Facebook Culinary Team," where "Facebook Culinary Team" in the structured query is a query token corresponding to yet another social-graph element. In particular embodiments, social-networking system 160 may rank the generated structured queries. The structured queries may be ranked based on a variety of factors. In particular embodiments, the social-networking system 160 may ranks structured queries based on advertising sponsorship. An advertiser (such as, for example, the user or administrator of a particular profile page corresponding to a particular node) may sponsor a particular node such that a structured query referencing that node may be ranked more highly. Although this disclosure describes generating particular structured queries in a particular manner, this disclosure contemplates generating any suitable structured queries in any suitable manner.

In particular embodiments, social-networking system 160 may transmit one or more of the structured queries to the first user (i.e., the querying user). As an example and not by way of limitation, after the structured queries are generated, the social-networking system 160 may transmit one or more of the structured queries as a response (which may utilize AJAX or other suitable techniques) to the user's client system 130 that may include, for example, the names (name strings) of the referenced social-graph elements, other query limitations (e.g., Boolean operators, etc.), as well as, potentially, other metadata associated with the referenced social-graph elements. The web browser 132 on the querying user's client system 130 may display the transmitted structured queries in a drop-down menu 300, as illustrated in FIGS. 4A-4B. In particular embodiments, the transmitted queries may be presented to the querying user in a ranked order, such as, for example, based on a rank previously determined as described above. Structured queries with better rankings may be presented in a more prominent position. Furthermore, in particular embodiments, only structured queries above a threshold rank may be transmitted or displayed to the querying user. As an example and not by way of limitation, as illustrated in FIGS. 4A-4B, the structured queries may be presented to the querying user in a drop-down menu 300 where higher ranked structured queries may be presented at the top of the menu, with lower ranked structured queries presented in descending order down the menu. In the examples illustrated in FIGS. 4A-4B, only the seven highest ranked queries are transmitted and displayed to the user. In particular embodiments, one or more references in a structured query may be highlighted (e.g., outlined, underlined, circled, bolded, italicized, colored, lighted, offset, in caps) in order to indicate its correspondence to a particular social-graph element. As an example and not by way of limitation, as illustrated in FIGS. 4A-4B, the references to "Stanford University" and "Stanford, Calif." are highlighted (outlined) in the structured queries to indicate that it corresponds to a particular concept node 204. Similarly, the references to "Friends", "like", "work at", and "go to" in the structured queries presented in drop-down menu 300 could also be highlighted to indicate that they correspond to particular edges 206. Although this disclosure describes transmitting particular structured queries in a particular manner, this disclosure contemplates transmitting any suitable structured queries in any suitable manner.

In particular embodiments, social-networking system 160 may receive from the first user (i.e., the querying user) a selection of one of the structured queries. Alternatively, the social-networking system 160 may receive a structured query as a query selected automatically by the system (e.g., a default selection) in certain contexts. The nodes and edges referenced in the received structured query may be referred to as the selected nodes and selected edges, respectively. As an example and not by way of limitation, the web browser 132 on the querying user's client system 130 may display the transmitted structured queries in a drop-down menu 300, as illustrated in FIGS. 4A-4B, which the user may then click on or otherwise select (e.g., by simply keying "enter" on his keyboard) to indicate the particular structured query the user wants the social-networking system 160 to execute. Upon selecting the particular structured query, the user's client system 130 may call or otherwise instruct to the social-networking system 160 to execute the selected structured query. Although this disclosure describes receiving selections of particular structured queries in a particular manner, this disclosure contemplates receiving selections of any suitable structured queries in any suitable manner.

More information on structured search queries may be found in U.S. patent application Ser. No. 13/556,072, filed 23 Jul. 2012, which is incorporated by reference.

Generating Search Results and Snippets

Figure 7A:
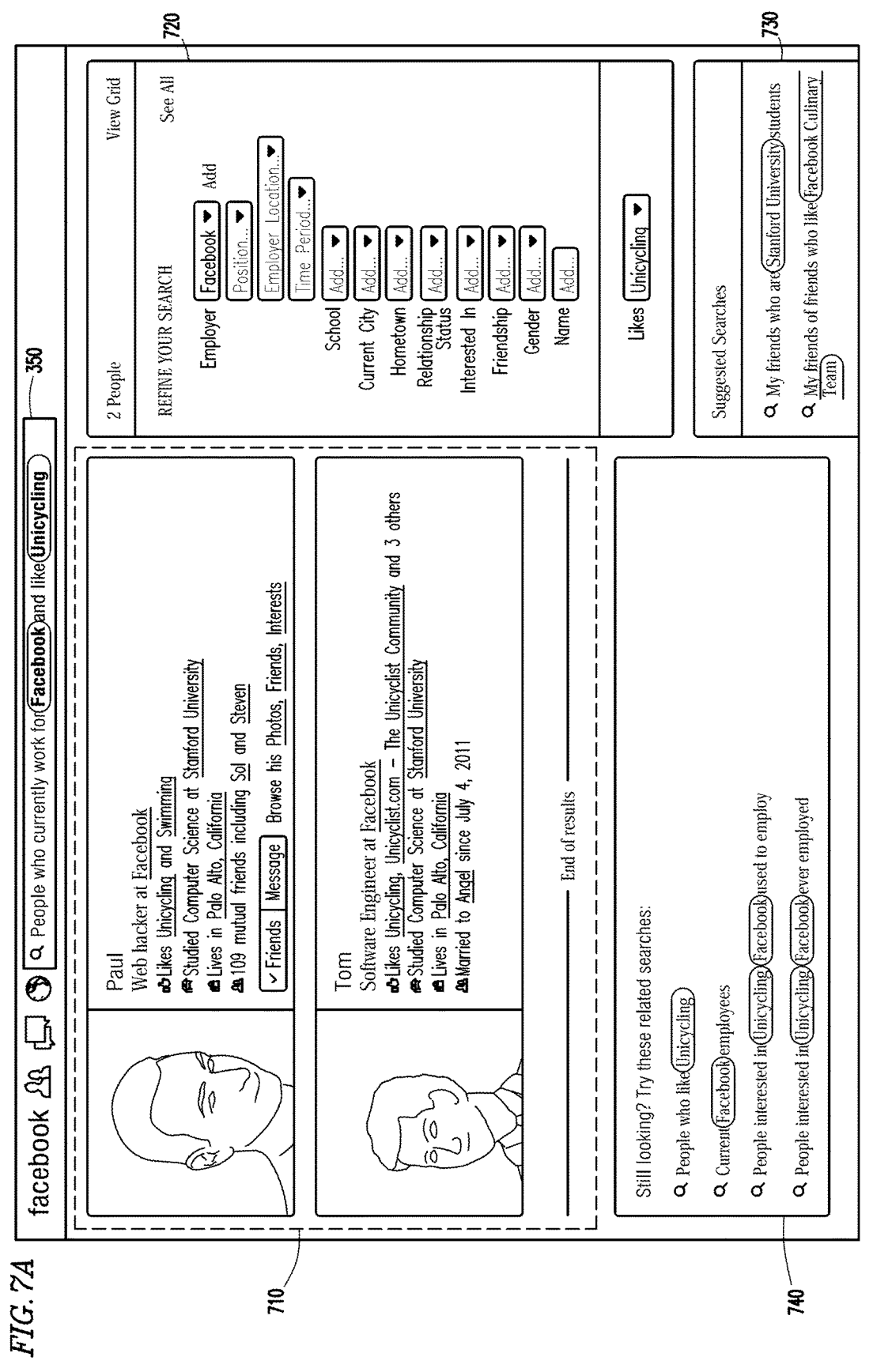
Figure 7B:
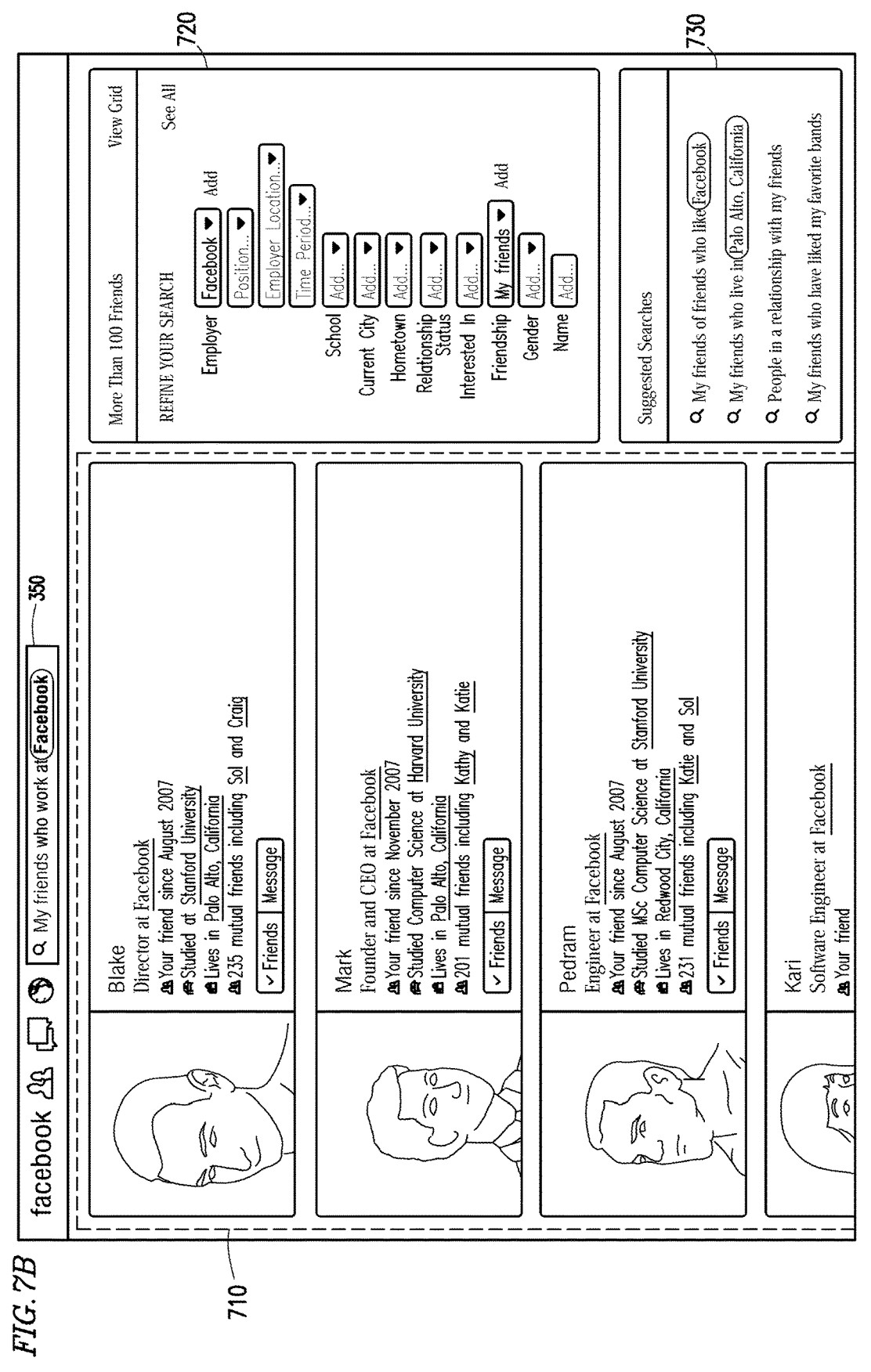
Figure 7C:
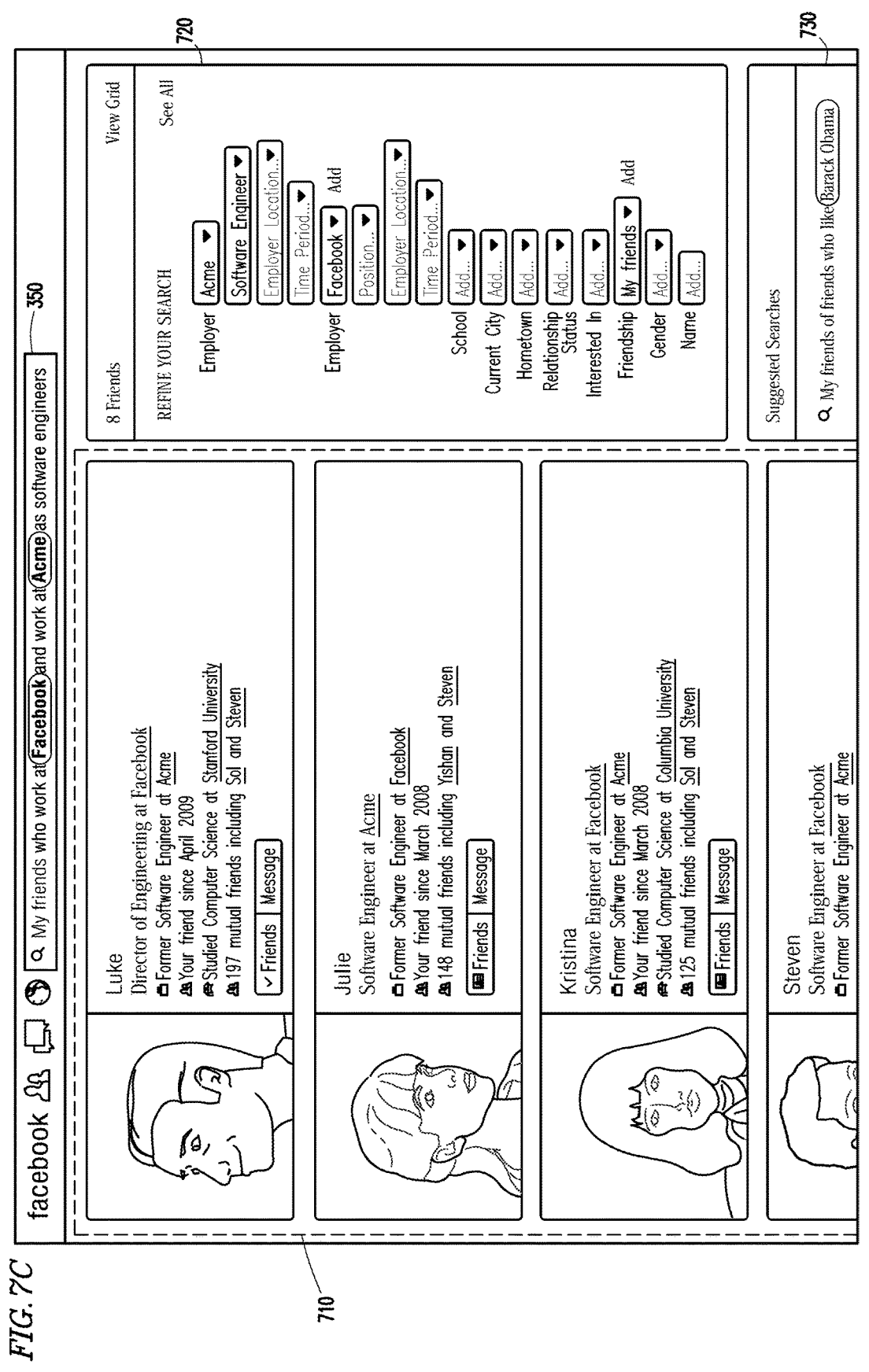
Figure 7D:
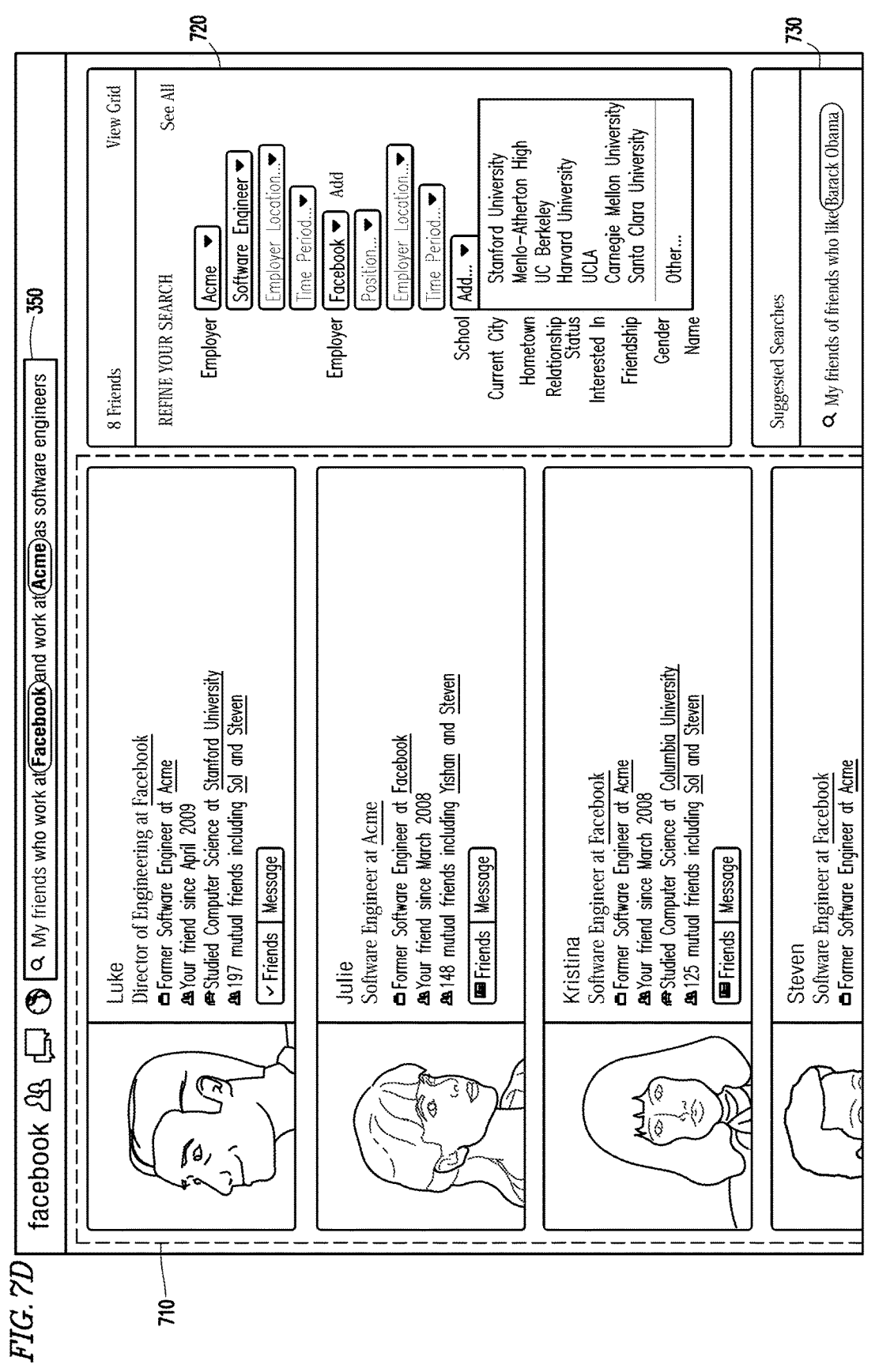
Figure 7E:
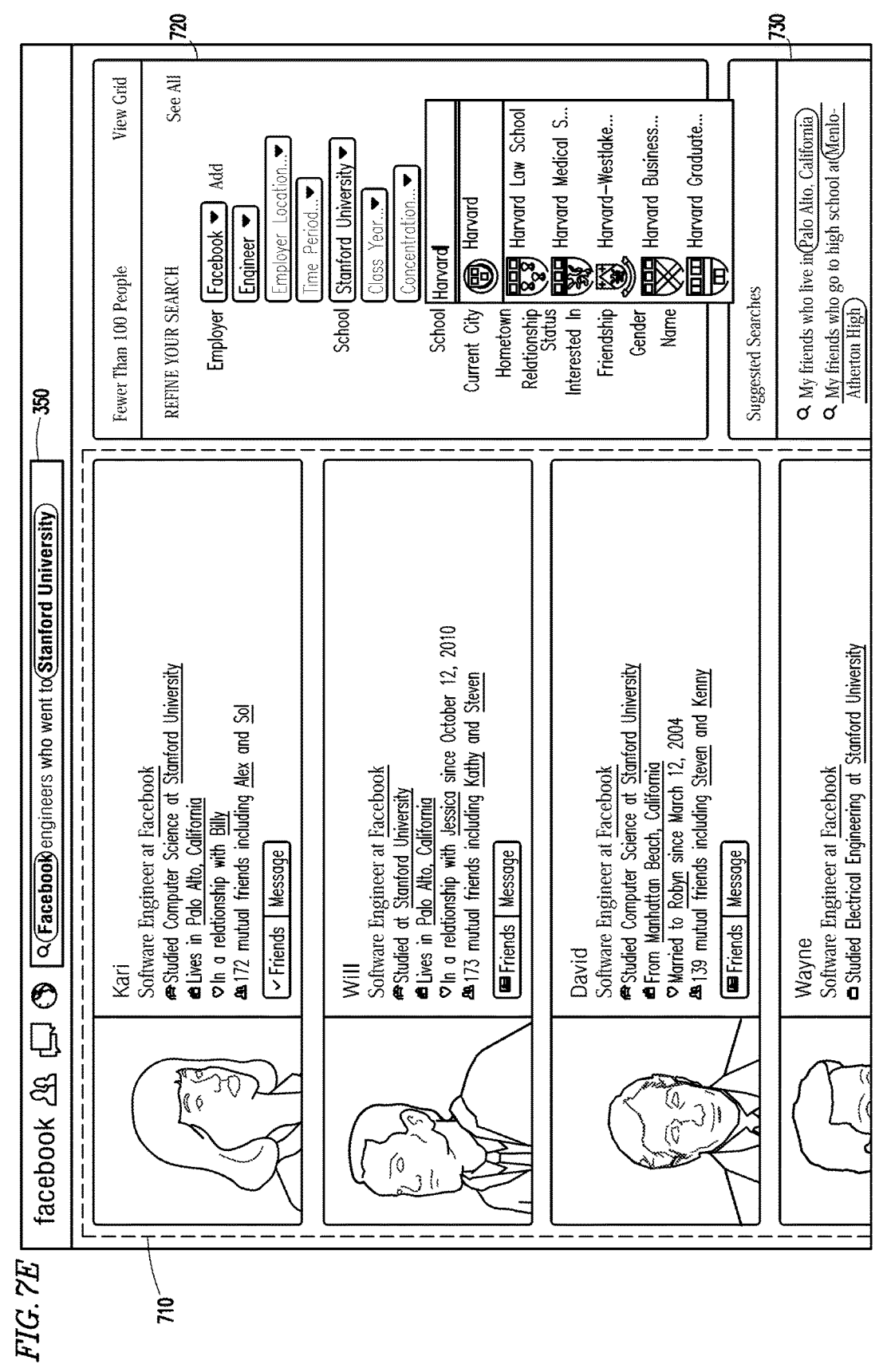
Figure 7F:
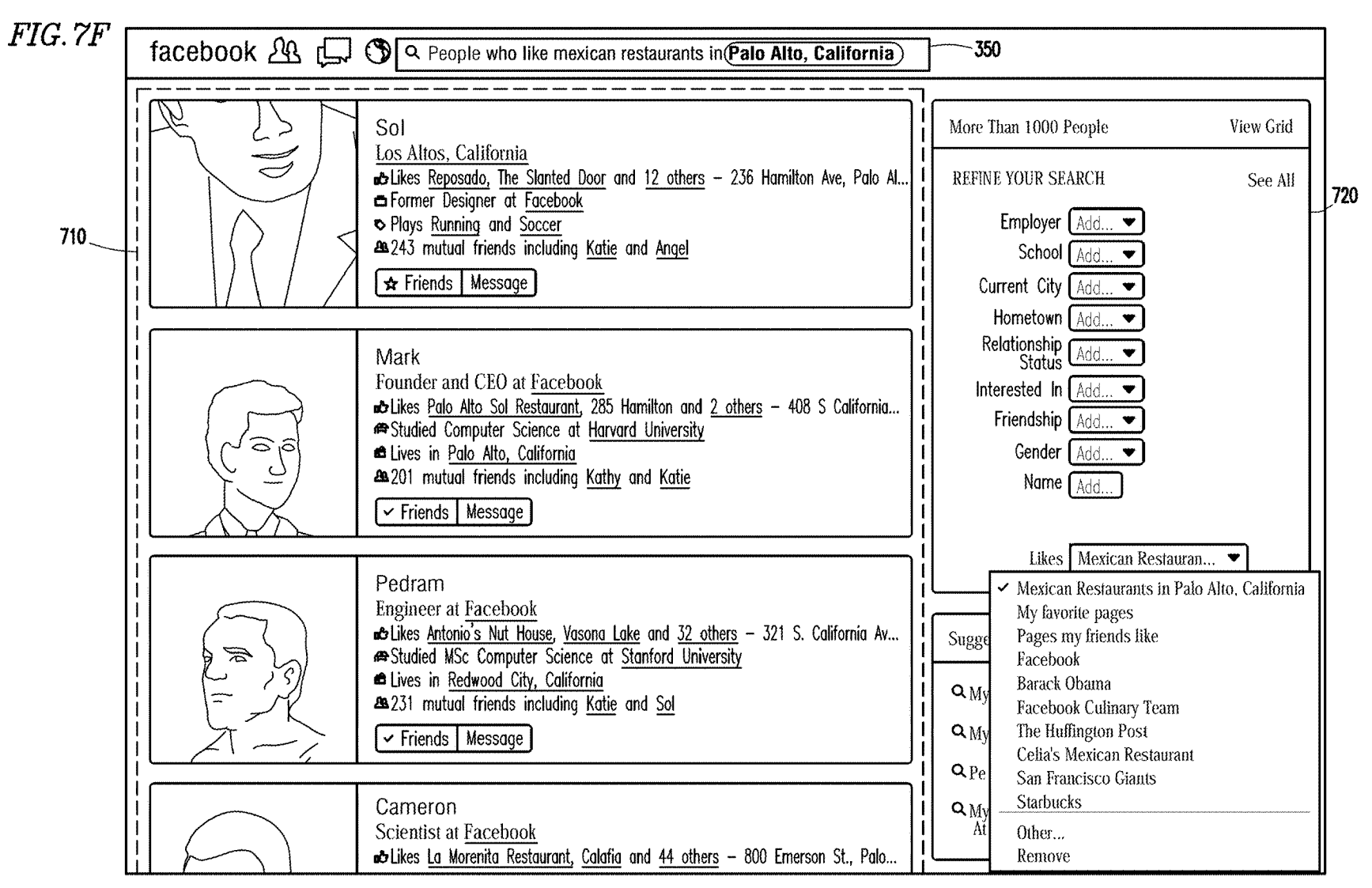
Figure 7G:
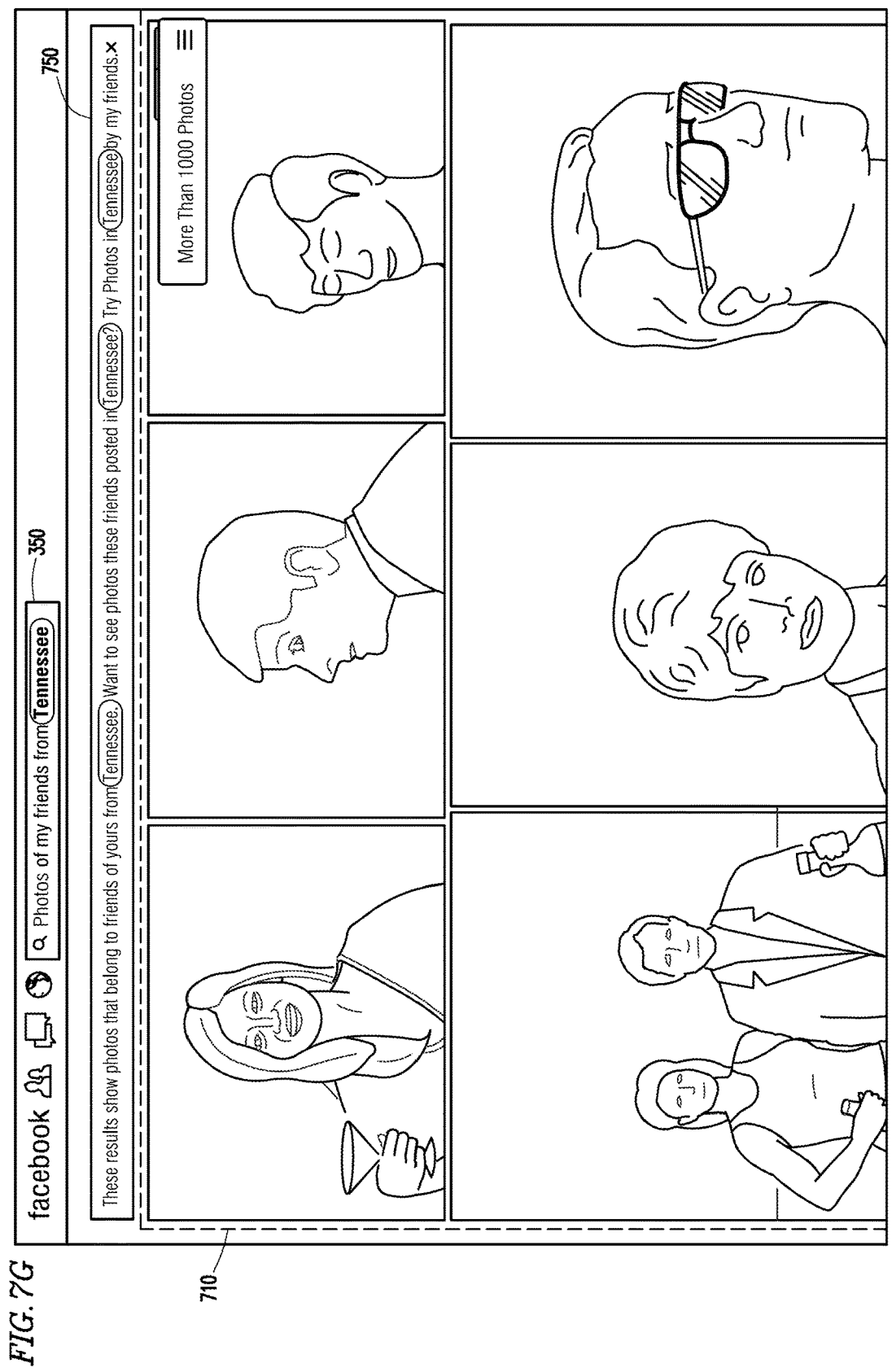

FIGS. 7A-7G illustrate example search-results pages. In response to a structured query received from a querying user (also referred to as the "first user"), the social-networking system 160 may generate one or more search results, where each search result matches (or substantially matches) the terms of the structured query. In particular embodiments, the social-networking system 160 may receive a structured query from a querying user (also referred to as the "first user", corresponding to a first user node 202). In response to the structured query, the social-networking system 160 may generate one or more search results corresponding to the structured query. Each search result may include link to a profile page and a description or summary of the profile page (or the node corresponding to that page). The search results may be presented and transmitted to the querying user as a search-results page. FIGS. 7A-7G illustrate various example search-results pages generated in response to various structured queries. The structured query used to generate a particular search-results page is shown in query field 350, and the various search results generated in response to the structured query are illustrated in results field 710. In particular embodiments, the query field 350 may also serve as the title bar for the page. In other words, the title bar and query field 350 may effectively be a unified field on the search-results page. As an example, FIG. 7G illustrates a search-results page with the structured query "Photos of my friends from Tennessee" in query field 350. This structured query also effectively serves as the title for the generated page, where the page shows a plurality of photos of the querying user's friends who are from Tennessee. The search-results page may also include a modifications field 720, a suggested-searches field 730, an expanded-searches field 740, or a disambiguation field 750. These additional fields are discussed more below. When generating the search results, the social-networking system 160 may generate one or more snippets for each search result, where the snippets are contextual information about the target of the search result (i.e., contextual information about the social-graph entity, profile page, or other content corresponding to the particular search result). In particular embodiments, at least one snippet for each search result will be a lineage snippet, which describes how the search result matches to the selected node and selected edges from the structured query that was used to generate the search result. These lineage snippets provide context about how a particular search result satisfies the terms of the structured query with respect to social-graph elements. Although this disclosure describes and illustrates particular search-results pages, this disclosure contemplates any suitable search-results pages. Furthermore, although this disclosure describes and illustrates generating particular snippets in a particular manner, this disclosure contemplates generating any suitable snippets in any suitable manner.

In particular embodiments, the social-networking system 160 may generate one or more search results corresponding to a structured query. The search results may identify resources or content (e.g., user-profile pages, content-profile pages, or external resources) that match or are likely to be related to the search query. In particular embodiments, each search result may correspond to a particular user node 202 or concept node 204 of the social graph 200. The search result may include a link to the profile page associated with the node, as well as contextual information about the node (i.e., contextual information about the user or concept that corresponds to the node). As an example and not by way of limitation, referencing FIG. 7B, the structured query "My friends who work at Facebook" in query field 350 generated the various search results illustrated in results field 710. Each search result in results field 710 shows a link to a profile page of a user (illustrated as the user's name, which contains an inline link to the profile page) and contextual information about that user that corresponds to a user node 202 of the social graph 200. As another example and not by way of limitation, referencing FIG. 7G, the structured query "Photos of my friends from Tennessee" in query field 350 generated the various search results illustrated in results field 710. Each search result illustrated in FIG. 7G shows a thumbnail of a photograph that corresponds to a concept node 204 of the social graph. In particular embodiments, each search result may correspond to a node that is connected to one or more of the selected nodes by one or more of the selected edges of the structured query. As an example and not by way of limitation, referencing FIG. 2, if user "C" submits a structured query "Friends who like the Old Pro", which references the friend-type edge 206 and the concept node 204 of the location "Old Pro", the social-networking system 160 may return a search result corresponding to user "B" because the user node 202 of user "B" is connected to the user node 202 of user "C" by a friend-type edge 206 and also connected to the concept node 204 of the location "Old Pro" by a like-type edge 206. In particular embodiments, the social-networking system 160 may also transmit advertisements or other sponsored content to the client system 130 in response to the structured query. The advertisements may be included in as part of the search results, or separately. The advertisements may correspond to one or more of the objects referenced in the search results. In particular embodiments, the social-networking system 160 may filter out one or more search results identifying particular resources or content based on the privacy settings associated with the users associated with those resources or content. Although this disclosure describes generating particular search results in a particular manner, this disclosure contemplates generating any suitable search results in any suitable manner.

In particular embodiments, a search result may include one or more snippets. A snippet is contextual information about the target of the search result. In other words, a snippet provides information about that page or content corresponding to the search result. As an example and not by way of limitation, a snippet may be a sample of content from the profile page (or node) corresponding to the search result. A snippet may be included along with search results for any suitable type of content. In particular embodiments, the snippets displayed with a search result may be based on the type of content corresponding to the search result. As an example and not by way of limitation, if the querying user is searching for users, then the snippets included with the search results may be contextual information about the users displayed in the search results, like the user's age, location, education, or employer. As another example and not by way of limitation, if the querying user is searching for photos, then the snippets included with the search results may be contextual information about the photos displayed in the search results, like the names of people or objects in the photo, the number of likes/views of the photo, or the location where the photo was taken. As yet another example and not by way of limitation, if the querying user is search for a location, then the snippets included with the search results may be contextual information about the locations displayed in the search results, like the address of the location, operating hours of the location, or the number of likes/check-ins at the location. The information provided in a snippet may be selected by the owner/administrator of the target page, or may be selected automatically be the social-networking system 160. Snippets may be used to display key information about a search result, such as image thumbnails, summaries, document types, page views, comments, dates, authorship, ratings, prices, or other relevant information. In particular embodiments, a snippet for a search result corresponding to users/concepts in an online social network may include contextual information that is provided by users of the online social network or otherwise available on the online social network. As an example and not by way of limitation, a snippet may include one or more of the following types of information: privacy settings of a group; number of members in a group; sponsored messages (e.g., an inline ad unit rendered as a snippet); page categories; physical address; biographical details; interests; relationship status; sexual orientation/preference; sex/gender; age; birthday; current city; education history; political affiliations; religious beliefs; work history; applications used; comments; tags; other suitable contextual information; or any combination thereof. In particular embodiments, a snippet may include references to nodes or edges from the social graph 200. These snippets may be highlighted to indicate the reference corresponds to a social-graph element. As an example and not by way of limitation, FIG. 7F illustrates a search result for the user "Sol", where one of the snippets for that search result is "Likes Reposado, The Slanted Door, and 12 others." The terms "Reposado" and "The Slanted Door" are both highlighted (underlined) in this example to indicate that they are references to concept nodes 204 corresponding to the concepts "Reposado" and "The Slanted Door", which are restaurants liked by the user "Sol" (i.e., the user node 202 for "Sol" is connected to the concept nodes 204 for "Reposado" and "The Slanted Door" by a like-type edge 206). The highlighted references in this example also contain inline links to the concept-profile pages corresponding to "Reposado" and "The Slanted Door". In particular embodiments, the social-networking system 160 may filter out one or more snippets for a search result based on the privacy settings associated with the user identified by the search result. Although this disclosure describes particular types of snippets, this disclosure contemplates any suitable types of snippets.

In particular embodiments, a search result may include at least one snippet comprising one or more references to the selected nodes and the selected edges of a structured search query. In other words, in response to a structured search query, the social-networking system 160 may generate a search result with a snippet providing contextual information related to how the search result matches the search query. These may be referred to as lineage snippets, since they provide social-graph information (node/edge relationship information) contextualizing how the particular search result is related to the social-graph elements of the structured query. In other words, a lineage snippet is a way of providing proof to the querying user that a particular search result satisfies a structured query. As an example and not by way of limitation, FIG. 7D illustrates a search-results page for the structured query "My friends who work at Facebook and work at Acme as software engineers." The social-graph elements referenced in the structured query include "my friends" (i.e., user nodes 202 connected to the querying user's node by a friend-type edge 206), "who work at Facebook (i.e., user nodes 202 connected to the concept node 204 for "Facebook" by a work-at-type edge 206), and "work at Acme" (i.e., user nodes 202 connected to the concept node 204 for "Acme" by a work-at-type edge 206). The first search result illustrated in FIG. 7D for "Luke" includes a snippet stating "Director of Engineering at Facebook", which corresponds to the "who work at Facebook" token from the structured query. Thus, this snippet shows that the search result for "Luke" satisfies the "who work at Facebook" requirement of the structured query because "Luke" is "Director of Engineering at Facebook." Other snippets in the "Luke" search result provide further context showing how that search result satisfies the other criteria of the structured query. In other words, the user node 202 for "Luke" is connected to the concept node 204 for "Facebook" by a work-at-type edge 206. In particular embodiments, a lineage snippet may include one or more of the following types of social-graph information: school attended; worked in/at; pages liked; apps used; subscribing to; subscribed by; family relationships; relationship connections (married to; dating; etc.); lives in/near; places checked into; places visited by; number of friends that live at a location; number of friends that study at a location; friends that are members of a group; number of likes; number of people talking about a page; number of subscribers; friends using an application; number of users of an application; people tagged in media; people commented on/in media; people who created media; other suitable social-graph information; or any combination thereof. In particular embodiments, one or more of the references to the selected nodes or the selected edges in the lineage snippet may be highlighted to indicate that the reference corresponds to a selected node or a selected edge. Although this disclosure describes particular types of lineage snippets, this disclosure contemplates any suitable types of lineage snippets.

In particular embodiments, a search result may include a snippet comprising a reference to one or more nodes that are connected to the user node 202 of the querying user by one or more edges 206. In other words, the search result may include a snippet with contextual information about how the search result is related to the querying user's friends or related to concept nodes 204 connected to the user. These may be referred to as social snippets, since they provide social-graph information (node-edge relationship information) contextualizing how the particular search result is connected to the querying user and/or the user's friends/interests. As an example and not by way of limitation, FIG. 7D illustrates a search-results page for the structured query "My friends who work at Facebook and work at Acme as software engineers." The first search result illustrated in FIG. 7D for "Luke" includes a snippet stating "Your friend since April 2009". This snippet provides contextual information about how the "Luke" search result is related to the querying user. In other words, the user node 202 for "Luke" is connected to the querying user's node by a friend-type edge 206. The "Luke" search result also includes a snippet stating "197 mutual friends included Sol and Steven." This snippet provides contextual information about how the "Luke" search result is related to other nodes connected to the querying user. In other words, both the user node 202 of the querying user and the user node 202 for "Luke" are connected to the same 197 user nodes 202 by friend-type edges 206. In particular embodiments, the search result may include multilevel lineage snippet. A multilevel lineage snippet provides contextual information about how users or concepts references in the snippet may be related to the query tokens from the structured query. This may be used in response to complex structured queries. As an example and not by way of limitation, user "A" and user "D" may be connected in the social graph 200 by a brother-type edge 206 (indicating that they are brothers). In response to a structured query for "Show people who are brothers of Acme employees", the social-networking system 160 may generate a search result for user "A" with a snippet stating, "Brother of User D. User D is a software engineer at Acme". This snippet provides contextual information about how the user "A" search result is related to user "D" (they are brothers, connected by a brother-type edge 206), and how user "D" is related to "Acme" (user "D" is connected to "Acme" by a worked-at-type edge 206). Although this disclosure describes particular types of social snippets, this disclosure contemplates any suitable types of social snippets.

In particular embodiments, a search result may include a snippet that includes a customized structured query. This may be presented, for example, as an inline link within the snippet. The querying user may then be able to click or otherwise select once of a customized structured queries to transmit the query to the social-networking system 160. In particular embodiments, the customized structured query may be customized based on the associated search result, such that the customized structured query includes a reference to the node corresponding to the search result (and possible references to other social-graph elements. As an example and not by way of limitation, referencing FIG. 7A, the search result for "Paul" includes a snippet reading "Browse his Photos, Friends, Interests", where "Photo", "Friends", and "Interests" are each customized structured queries to search for "Photos of Paul" (i.e., concept nodes 204 of photos that are connected to the user node 202 of "Paul" by a tagged-in-type edge 206), "Friends of Paul", and "Interests of Paul" (i.e., concept nodes 204 that are connected to the user node of "Paul" by an interested-in-type edge 206), respectively. In particular embodiments, the customized structured query may be customized based on the associated search result and the selected nodes/edges from the original structured query (i.e., the structured query that was used to produce the search result). These customized structured queries would then include a reference to the node corresponding to the search result and references to the selected nodes and the selected edges from the original structured query. These may be referred to as lineage-pivot snippets, since they are based on the social-graph elements from the original structured query, like a lineage snippet, as well as the node corresponding to the search result, thus pivoting the query based on the search result. As an example and not by way of limitation, again referencing FIG. 7A, the structured query "People who currently work for Facebook and like Unicycling" generated the search results illustrated in results field 710. The search result for "Tom" could include a snippet with a structured query "Friends of Tom who like Unicycling", thus referencing both the user node 202 of the search result (i.e., the user node 202 of "Tom") and a selected node and selected edge from the original structured query (i.e., the concept node 204 for "Unicycling" connected by a like-type edge 206). As another example and not by way of limitation, referencing FIG. 7F, the structured query "People who like mexican restaurants in Palo Alto, Calif." generated the search results illustrated in results field 710. The search result for "Sol" includes a snippet "Like Reposado, The Slanted Door and 12 others", where "Reposado" and "The Slanted Door" are both reference to concept nodes 204 for particular Mexican restaurants in Palo Alto. Similarly, the reference to "12 others" could be an inline link for a structured query "Mexican restaurants liked by Sol in Palo Alto, Calif.", thus referencing both the user node 202 of the search result (i.e., the user node 202 of "Sol") and a selected node and selected edge from the original structured query (i.e., the concept node 204 for "Palo Alto, Calif." and the like-type edge 206). Although this disclosure describes generating particular snippets with customized structured queries, this disclosure contemplates generating any suitable snippets with customized structured queries.

In particular embodiments, the social-networking system 160 may score one or more snippets corresponding to a search result (or snippets corresponding to a node or profile page that is the target of the search result). In response to a structured query, the social-networking system 160 may identify nodes corresponding to the query and then access one or more snippets corresponding to each of these identified nodes. The social-networking system 160 may then determine, for each search result, a score for each of the snippets corresponding to the search result. When generating a search result, only those snippets having a score greater than a snippet-threshold score may be included in the search result. The score may be, for example, a confidence score, a probability, a quality, a ranking, another suitable type of score, or any combination thereof. As an example and not by way of limitation, the social-networking system 160 may determine a ranking for each snippet, where only the top five ranked snippets are included in a particular search result. Alternatively, the social-networking system 160 may score each snippet and include all available snippets with the search result, presented in ranked order by score (possibly bypassing a ranking threshold to display a greater number of snippets with a search result). Furthermore, different search results may include different numbers of snippets. For example, a first search result may only have two snippets associated with it and both snippets might be displayed in ranked order by score, while a second search result may have nine snippets associated with it and all nine snipped may be displayed in ranked order by score. In particular embodiments, the social-networking system 160 may determine a score for a snippet based on the social relevance of the snippet to the structured query. Snippets that reference social-graph elements that are more closely connected or otherwise relevant to the querying user may be scored more highly than snippets that reference social-graph elements that are not as closely connected or are otherwise less relevant to the querying user. In particular embodiments, the social-networking system 160 may determine a score for a snippet based on the textual relevance of the snippet to the structured query. The textual relevance of a particular snippet may be based on how the terms and number of terms in the particular snippet match to the text query received from the querying user. In particular embodiments, the social-networking system 160 may determine a score for a snippet based on a search history associated with the querying user. Snippets referencing social-graph elements that the querying user has previously accessed, or are relevant to nodes/profile pages the querying user has previously accessed, may be more likely to be relevant to the user's structured query. Thus, these snippets may be given a higher relative score. As an example and not by way of limitation, if the querying user has previously search for "My female friends who are single", then the social-networking system 160 may determine that the querying user is interested in the relationship status of people he is searching for because of the query modifier "who are single" in the query, which will search for users having a relationship status of "single". Thus, in response to subsequent queries (e.g., "Facebook engineers who went to Stanford University", as illustrated in FIG. 7E), the social-networking system 160 may score snippets showing the relationship status of the search result more highly than other snippets because of the querying user's history of interest in that type of contextual information (thus, the search results illustrated in FIG. 7E may have scored the snippets showing the relationship statues for each search result more highly, such as, for example "in a relationship" or "married"). In particular embodiments, the social-networking system 160 may determine a score for a snippet based on a category of the search. Searches may be categorized based on the type of content that is the subject of the search. Snippets that are more relevant to the type of content being searched for may be scored more highly than less relevant snippets. As an example and not by way of limitation, when searching for user, snippets that include personal information about the user (e.g., location, relationship status, etc.) may be scored more highly than other types of snippets, since personal information may be considered more relevant to a querying user searching for other users. As another example and not by way of limitation, when searching for concepts, snippets that include social-graph information about the concept (e.g., number of subscribers/fan, number of likes, number of check-ins/reviews, etc.) may be scored more highly than other types of snippets, since social-graph information may be more relevant to a querying user searching for concepts. In particular embodiments, the social-networking system 160 may determine a score for a snippet based on advertising sponsorship. An advertiser (such as, for example, the user or administrator of a particular profile page corresponding to a particular node) may sponsor a particular node such that a snippet referencing that node may be scored more highly. Although this disclosure describes scoring snippets in a particular manner, this disclosure contemplates scoring snippets in any suitable manner.

FIG. 8 illustrates an example method 800 for generating search results and snippets. The method may begin at step 810, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 820, the social-networking system 160 may receiving from the first user a structured query comprising references to one or more selected node from the plurality of second nodes and one or more selected edges from the plurality of edges. At step 830, the social-networking system 160 may generate search results corresponding to the structured query. Each search result may correspond to a second node of the plurality of second nodes. Furthermore, each search result may comprise one or more snippets of contextual information about the second node corresponding to the search result. At least one snippet of each search result comprises one or more references to the selected nodes and the selected edges of the structured query. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Modifying Structured Search Queries

As discussed previously, FIGS. 7A-7G illustrate example search-results pages. The structured query used to generate a particular search-results page is shown in query field 350, and the various search results generated in response to the structured query are illustrated in results field 710. In response to a structured query received from a querying user, the social-networking system 160 may generate one or more query modifications that may be used to refine or pivot the query. The query modifications may reference particular social-graph elements, allowing the querying user to add or replace the social-graph elements referenced in a structured query. In particular embodiments, one or more query modifications may be presented on a search-results page in a modifications field 720, a suggested-searches field 730, an expanded-searches field 740, or a disambiguation field 750. Query modifications may be used to refine or narrow a structured query by adding additional terms to the query. In general, adding additional terms to a structured query will reduce the number of search results generated by the query. As an example and not by way of limitation, in response to the structured query "My friends who go to Stanford University," the social-networking system 160 may generate query modifications to the "My friends" term such as, for example, "My [male/female] friends" to filter the search results by sex, or "My [single/married] friends" to filter the search results by relationship status. Query modifications may also be used to pivot or broaden a structured query by changing one or more terms of the query. As an example and not by way of limitation, in response to the structured query "My friends who work at Facebook", the social-networking system 160 may generate the query modification "work at Acme", which can replace the "work at Facebook" term, thereby pivoting the query from searching one set of users to searching another set. By providing these suggested query modifications to the querying user, the social-networking system 160 may provide a powerful way for users to search for exactly what they are looking for. Once a query modification is selected by the querying user, a new structured query may be generated using an appropriate grammar, such that the new structured query is also rendered using a natural-language syntax. The social-networking system 160 may also generate alternative structured queries that may be displayed on the search-results page. These alternative structured queries include suggested queries, broadening queries, and disambiguation queries, which are described more below. Although this disclosure describes generating querying modifications in a particular manner, this disclosure contemplates query modifications in any suitable manner. Moreover, although this disclosure describes presenting query modifications to users in a particular manner, this disclosure contemplates presenting query modifications to users in any suitable manner.

In particular embodiments, the social-networking system 160 may generate one or more query modifications. The query modifications may be generated in response to receiving a first structured query, such that the query modification may be used to modify the first structured query. A query modification may be any type of term that can be used to modify a search query. For example, a query modification may be a text string, an n-gram, a terminal/query token, a value, a property, a query operator, another suitable type of term, or any combination thereof. In particular embodiments, the query modifications may be organized by category. As an example and not by way of limitation, the modifications field 720 illustrated in FIG. 7A shows query modifications for "Employer", "School", "Current City", "Hometown", "Relationship Status", "Interested in", "Friendship", "Gender", "Name", and "Likes". In particular embodiments, the query modifications may be transmitted to the querying user as part of the search-results page. As an example and not by way of limitation, the search-results pages illustrated in FIGS. 7D, 7E, and 7F all illustrate lists of query modifications displayed in drop-down menus in the modifications field 720. The query modifications listed in these drop-down menus may be used to add or replace terms in the structured query displayed in search field 350. In particular embodiments, a customized query modification may be generated in conjunction with a typeahead process. Rather than selecting from a list of pre-generated query modifications, a user may input a text string, and the typeahead process may identify social-graph elements that correspond to one or more of the n-grams from the inputted text string. The social-networking system 160 may then present one or more possible matches. As an example and not by way of limitation, FIG. 7E illustrates the querying user inputting the string "Harvard" into an input field for the "School" category in the modifications field 720. In response, the typeahead process has generated several possible matching query modifications, including "Harvard", "Harvard Law School", and "Harvard-Westlake", among others. These listed schools displayed in the drop-down menu are references to concept nodes 204 in the social graph 200 that correspond to these schools. Although this disclosure describes and illustrates particular categories of query modifications, this disclosure contemplates any suitable categories of query modifications.

In particular embodiments, a query modification may include references to one or more modifying nodes or one or more modifying edges from the social graph 200. A modifying node or a modifying edge may be used to add or replace a reference to a node or edge in the first structured query. The querying user may then selected one or more of these query modifications to add the modifying nodes/edges to the first structured query, or by replacing nodes/edges in the structured query with one or more of the modifying nodes/edges. As an example and not by way of limitation, FIG. 7D illustrates an example search-results page generated by the structured query "My friends who work at Facebook and work at Acme as software engineers". The querying user may want to refine the search by also specifying a school attended by the users identified by the search query. To specify a school, the querying user may click on the "School" drop-down menu, as illustrated in FIG. 7D, which may display a list of query modifications generated by the social-networking system 160. In this case, the drop-down menu in FIG. 7D lists the schools "Stanford University", "Menlo-Atherton High", and "UC Berkeley", among others. These listed schools displayed in the drop-down menu are references to concept nodes 204 in the social graph 200 that correspond to these schools. The querying user may then select one or more of these query modifications to add the referenced school to the structured query, thereby filtering the search results by school. In response to the selection from the querying user, the social-networking system 160 may modify the structured query to include a reference to the selected school. As another example and not by way of limitation, FIG. 7B illustrates an example search-results page generated by the structured query "My friends who work at Facebook". The reference to "my friends" corresponds to user nodes 202 connected to the querying user by a friend-type edge 206, while the reference to "Facebook" corresponds to the concept node 204 for the company "Facebook." These references to particular nodes and edges in the structured query are shown in the modifications field 720 illustrated in FIG. 7B, where the category for "Employer" already has the term "Facebook" selected, while the category for "Friendship" already has the term "My friends" selected. However, the querying user may want to pivot the search to instead search for friends at another company. To modify the query, the querying user may select the "Employer" category to change the reference from "Facebook" to another company, such as, for example, "Acme." When the querying user selects the "Employer" category, the social-networking system 160 may display a list of query modifications that have been generated for that category. In response to a selection from the querying user, the social-networking system 160 may then modify the structured query and replace the reference to "Facebook" with a reference to "Acme" (such that the new structured query would be "My friends who work at Acme"), thereby pivoting the search from one set of friends to another. Although this disclosure describes using particular query modifications in a particular manner, this disclosure contemplates using any suitable query modifications in any suitable manner.

In particular embodiments, the social-networking system 160 may generate a second structured query in response to a selection of one or more of the query modifications. The querying user may select one or more of the query modifications from the menus illustrated in modifications field 720, for example, by clicking or otherwise selecting a particular query modification. In particular embodiments, the query modification may reference additional nodes or additional edges for the first structured query. In this case, the social-networking system 160 may generate a second structured query comprising references to the selected nodes and the selected edges from the first structured query, and each modifying node or modifying edge referenced in the selected query modification. As an example and not by way of limitation, for the first structured query "My friends in San Jose", the social-networking system 160 may receive the query modification "work at Acme" (which references connections to the concept node 204 for "Acme" by a worked-at-type edge 206). The social-networking system 160 may then generate a second structured query "My friends in San Jose who work at Acme", which incorporates the addition node and additional edge referenced in the query modification. In particular embodiments, the query modification may reference alternative nodes or alternative edges for the first structured query. In this case, the social-networking system 160 may generate a second structured query comprising references to the selected nodes and the selected edges from the first structured query, except each reference to an alternative node replaces a reference to a selected node of the first structured query. Similarly, each reference to an alternative edge replaces a reference to a selected edge of the first structured query. As an example and not by way of limitation, for the first structured query "My friends in San Jose", the social-networking system 160 may receive the query modification "in San Francisco" (which references connections to the concept node 204 for the city "San Francisco" by live-in-type edges 206). The social-networking system 160 may then generate a second structured query "My friends in San Francisco", which replaces the reference to the selected node/edge "in San Jose" from the first structured query with the alternative node/edge "in San Francisco". Although this disclosure describes generating particular modified structured queries in a particular manner, this disclosure contemplates generating any suitable modified structured queries in any suitable manner.

In particular embodiments, the social-networking system 160 may score one or more query modifications for a first structured query. In response to a structured query, the social-networking system 160 may identify one or more query modifications that may be used to modify structured query. The social-networking system 160 may then determine a score for each of the identified query modifications. When generating a set of query modifications to transmit to a querying user, only those query modifications having a score greater than a query-modification-threshold score may be included in the set of query modifications that are actually transmitted. The score may be, for example, a confidence score, a probability, a quality, a ranking, another suitable type of score, or any combination thereof. As an example and not by way of limitation, the social-networking system 160 may determine a ranking for each query modification, where only the top six ranked query modifications are included in a particular search result. In particular embodiments, the social-networking system 160 may determine a score for a query modification based on the social relevance of the query modification to the structured query. Query modifications that reference social-graph elements that are more closely connected or otherwise relevant to the querying user may be scored more highly than query modifications that reference social-graph elements that are not as closely connected or are otherwise less relevant to the querying user. In particular embodiments, the social-networking system 160 may determine a score for a query modification based on the number of possible search results corresponding to the query modification. Query modifications that would generate more results (i.e., filter out fewer results) may be scored more highly than query modifications that generate fewer results. In other words, a query modification that, when used to modify to the first structured query, will match more results (or more of the current results) may be scored more highly than a query modification that will match fewer results. As an example and not by way of limitation, FIG. 7D illustrates possible query modifications for the "School" category in modification field 720. The query modification referencing "Stanford University" may be ranked highly in this list of suggested query modifications because many search results match this limitation. In other words, of the user nodes 202 corresponding to the search results in results field 710, many of those user nodes 202 may be connected to the concept node 204 for "Stanford University" by an edge 206. Thus, if a reference to the concept node 204 for "Stanford University" was added to the structured query illustrated in query field 350, many of the current search results would still match the structured query (i.e., few would be filtered out). Similarly, lower ranked schools in the drop-down menu, such as "Carnegie Mellon University" and "Santa Clara University" may match fewer of the current results (i.e., would filter out more results), and as such are ranked lower. Pivoting query modifications may be scored similarly. In particular embodiments, the social-networking system 160 may determine a score for a query modification based on a search history associated with the querying user. Query modifications referencing social-graph elements that the querying user has previously accessed, or are relevant to nodes/profile pages the querying user has previously accessed, may be more likely to be relevant to the user's structured query. Thus, these query modifications may be given a higher relative score. As an example and not by way of limitation, if the querying user has previously search for "My friends at Stanford University", then the social-networking system 160 may determine that the querying user is interested in user nodes 202 connected to the concept node 204 for "Stanford University." Thus, in response to subsequent queries, the social-networking system 160 may rank query modifications referencing "Stanford University" more highly than other query modifications because of the querying user's history of interest in that type of contextual information (thus, the search results illustrated in FIG. 7D may have ranked the query modifications for "Stanford University more highly). In particular embodiments, the social-networking system 160 may determine a score for a query modification based on advertising sponsorship. An advertiser (such as, for example, the user or administrator of a particular profile page corresponding to a particular node) may sponsor a particular node such that a query modification referencing that node may be scored more highly. Although this disclosure describes scoring query modifications in a particular manner, this disclosure contemplates scoring query modifications in any suitable manner.

In particular embodiments, in response to a first structured query, the social-networking system 160 may generate one or more second structured queries to pivot the structured query. Each of these second structured queries may be based on the first structured query. These may be referred to as suggested queries. These suggested queries may be variations of the first structured query, where the suggested query uses at least some of the same query tokens as the first structured query. However, in order to pivot the query, one or more of the query tokens from the first structured query may be replaced with alternative query tokens. In other words, the social-networking system 160 may replace one or more references to selected nodes/edges from the first structured query with one or more references to alternative nodes/edges in order to generate one or more second structured queries. The alternative query tokens may be determined by identifying query tokens that, if substituted into the first structured query, would produce similar search results. As an example and not by way of limitation, for the first structured query "My friends who go to Stanford University", the social-networking system 160 may identify one or more query tokens that may be substituted into the first structured query. For example, the query token for "Stanford University" may be replaced by other schools. As another example, the query tokens for "who go to" and "Stanford University" may both be replaced by query tokens for "who live in" and "Palo Alto". This latter example may produce many of the same search results as the first structured query because of the high overlap between users who live in the city Palo Alto and users who attend the school Stanford University since the school is geographical proximate to the city (i.e., in the social graph 200, there may be a large overlap between user nodes 202 that are connected to the concept node 204 for "Stanford" and the concept node 204 for "Palo Alto"). The alternative query tokens may also be determined by using templates based on the original query. As an example and not by way of limitation, if the first structured query is search for users, the suggested queries may also be searches for user. Similarly, if the first structured query is a search for photos, the suggested queries may also be searches for photos. In particular embodiments, the suggested queries may be transmitted to the querying user as part of the search-results page. As an example and not by way of limitation, the search-results page illustrated in FIG. 7B shows some example suggested queries in the suggested-searches field 730. In response to the first structured query "My friends who work at Facebook", the social-networking system 160 generated the suggested structured queries "My friends of friends who like Facebook" and "My friends who live in Palo Alto, Calif.", among others, which are shown in suggested-searches field 730. These suggested queries may have been generated based on the first structured query, where one or more of the query tokens from the first structured query have been replaced. Although this disclosure describes generating structured queries in a particular manner, this disclosure contemplates generating structured queries in any suitable manner.

In particular embodiments, in response to a first structured query, the social-networking system 160 may generate one or more second structured queries to broaden the structured query. These may be referred to as broadening queries. These broadening queries may be variations of the first structured query, where the broadening query uses less query tokens than the first structured query, or replaces particular query tokens in order to generate more search results. In other words, the social-networking system 160 may delete one or more references to selected nodes/edges from the first structured query in order to generate one or more second structured queries. Similarly, the social-networking system 160 may replace one or more references to selected nodes/edges from the first structured query with one or more references to alternative nodes/edges in order to generate one or more second structured queries. In this case, the alternative query tokens may be determined by identifying query tokens that, if substituted into the first structured query, would produce more search results than the original query token. In particular embodiments, broadening structured queries may be generated when the search results corresponding to the first structured query are below a threshold number of search results. Structured queries with too many limitations, or that use query tokens that do not match many social-graph entities, may produce few or no results. When a structured query produces too few results, it may be useful to provide suggests for how to modify that query to generate additional result. The social-networking system 160 may analyze the first structured query and provide suggestion for how to modify the query so that it produces more results. The threshold number of search results may be any suitable number of results, and may be determined by the social-networking system 160 or be user-defined. In particular embodiments, the social-networking system 160 may generate one or more second structured queries comprising references to zero or more selected nodes and zero or more selected edges from the first structured query, where each second structured query comprises at least one fewer reference to the selected nodes or the selected edges than the first structured query. As an example and not by way of limitation, referencing FIG. 7A, in response to the first structured query "People who currently work for Facebook and like Unicycling", the social-networking system 160 generated the broadening queries "People who like Unicycling" and "Current Facebook employees" in expanded-searched field 740. These broadening queries may have been generated based on the first structured query, where one more or of the query tokens from the first structured query have been removed (i.e., the references to "Facebook" and "Unicycling" have been removed, respectively). By removing limitations from the first structured query, more users should satisfy the query and thus these queries should generate more search results. In particular embodiments, the social-networking system 160 may generate one or more second structured queries comprising references to zero or more selected nodes and zero or more selected edges from the first structured query, where each second structured query comprises replaces at least one reference to a selected node or a selected edge of the first structured query with an alternative node or an alternative edge, respectively. As an example and not by way of limitation, referencing FIG. 7A again, the social-networking system 160 generated the broadening queries "People interested in Unicycling Facebook used to employ" and "People interested in Unicycling Facebook ever employed". These broadening query may have been generated based on the first structured query, where the "currently work for" query token has been replaced by "used to employ" and "ever employed" query tokens, respectively, thereby filtering search results using a different timeframe (which may expand the types of connecting edges that may satisfy this query from work-at-type edges 206 to also include worked-at-type edges 206). In particular embodiments, the broadening queries may be transmitted to the querying user as part of the search-results page. As an example and not by way of limitation, the search-results page illustrated in FIG. 7A shows some example broadening queries in the expanded-searches field 740, which have been discussed above. Although this disclosure describes generating particular broadening queries in a particular manner, this disclosure contemplates generating any suitable broadening queries in any suitable manner.

In particular embodiments, in response to a first structured query, the social-networking system 160 may generate one or more second structured queries to disambiguate the structured query. These may be referred to as disambiguation queries. These disambiguation queries may be variations of the first structured query, where the disambiguation query uses some of the query tokens from the first structured query, but may also replace some of the query tokens with alternative query tokens. This may happen where certain nodes may correspond to the same n-gram from an unstructured text query from the querying user (e.g., the n-gram for "stanford" could correspond to the concept node 204 for either the school "Stanford University" or the city "Stanford, Calif."). Disambiguation may also be helpful when the referenced edge-types or the relationships between referenced nodes are unclear in the structured query. The social-networking system 160 may determine that particular structured queries are ambiguous, in that the natural-language syntax of the structured query may be interpreted in different ways by the querying user. Consequently, when selecting a particular structured query, the social-networking system 160 may generate search results that are unexpected or not what the querying user was looking for. In these cases, the social-networking system 160 may provide an explanation of how the structured query was parsed and how it identified the displayed search results. Additionally, the social-networking system 160 may provide variations of the original query to help the querying user find what he or she is looking for. In particular embodiments, the disambiguation queries may be transmitted to the querying user as part of the search-results page. As an example and not by way of limitation, the search-results page illustrated in FIG. 7G illustrates an example disambiguation query displayed in disambiguation field 750. In response to the first structured query "Photos of my friends from Tennessee", the social-networking system 160 generated the disambiguation query "Photos in Tennessee by my friends". The social-networking system 160 also provided an explanation of how it parsed the first structured query, stating that "These results show photos that belong to friends of yours from Tennessee". In other words, the social-networking system 160 parsed the first structured query to identify concept nodes 204 corresponding to photos that were connected to user nodes 202 by a tagged-in-type edge 206, and where these user nodes 202 were connected to a concept node 204 for "Tennessee" by a lived-in- or from-type edge 206. In contrast, the suggested disambiguation query would identify concept nodes 204 corresponding to photos that were connected to the concept node 204 for "Tennessee" by a taken-in-type edge 206, where the concept nodes 204 for the photos were also connected to user nodes 202 of the querying user's friends. Although this disclosure describes generating particular disambiguation queries in a particular manner, this disclosure contemplates generating any suitable disambiguation queries in any suitable manner.

FIG. 9 illustrates an example method 900 for modifying structured search queries. The method may begin at step 910, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 920, the social-networking system 160 may receiving from the first user a structured query comprising references to one or more selected node from the plurality of second nodes and one or more selected edges from the plurality of edges. At step 930, the social-networking system 160 may generate one or more query modifications for the first structured query. Each query modification may comprises reference to one or more modifying nodes form the plurality of second nodes or one or more modifying edges from the plurality of edges. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
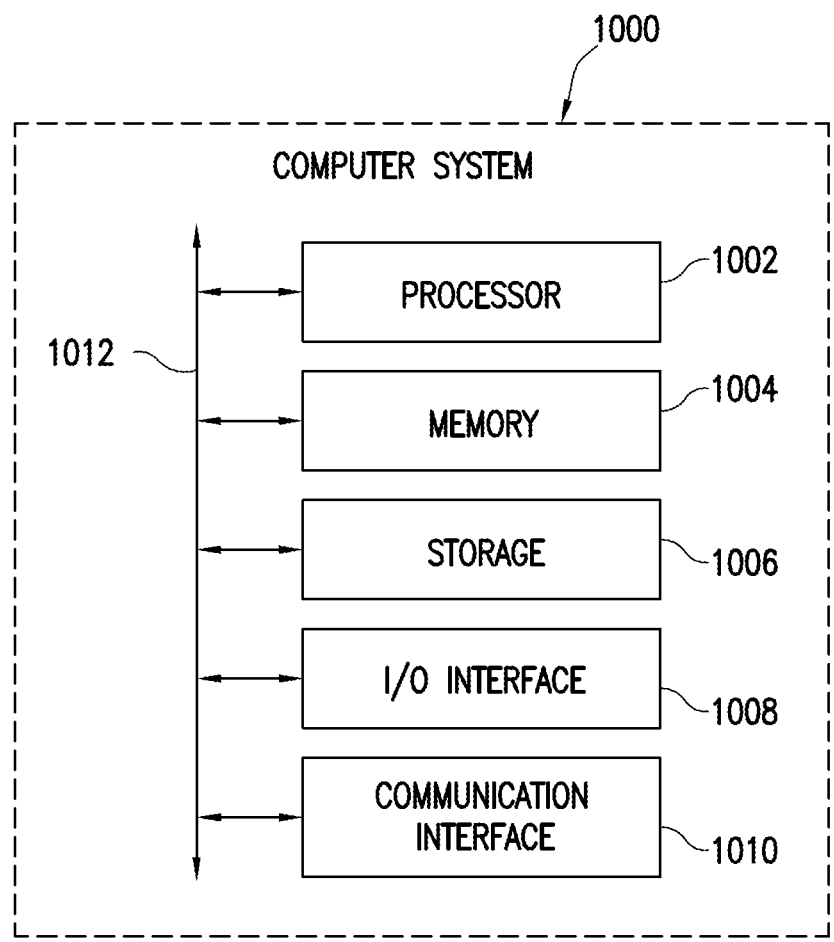
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
receiving, from a client system of a first user of an online social network, an unstructured text query inputted by the first user;
identifying, based on the unstructured text query, one or more objects associated with the online social network matching at least a portion of the unstructured text query;
accessing a context-free grammar model comprising a plurality of grammars, each grammar comprising one or more non-terminal tokens and one or more query tokens, each grammar being an ordered sub-tree adjoining one or more other grammars via a non-terminal token;
generating one or more structured queries, each structured query corresponding to a selected grammar of the context-free grammar model, wherein each structured query comprises a natural-language string generated by the selected grammar, each structured query comprising at least one query token corresponding to each of the identified object, wherein each structured query consists of the natural-language string generated by the selected grammar and one or more query tokens within the natural-language string corresponding to one or more of the identified objects, respectively; and
sending, to the client system of the first user, one or more of the structured queries as suggested queries for display to the first user in response to the unstructured text query inputted by the first user.

2. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of objects associated with the online social network, respectively.

3. The method of claim 1, wherein the plurality of grammars of the context-free grammar model is a grammar forest organized as an ordered tree comprising a plurality of non-terminal tokens and a plurality of query tokens, each grammar being an ordered sub-tree adjoining one or more other grammars via a non-terminal token.

4. The method of claim 3, further comprising:
identifying, based on the identified objects, one or more query tokens in one or more grammars of the grammar forest, each identified query token corresponding to at least one of the identified objects; and
selecting one or more grammars of the grammar forest, each selected grammar comprising at least one query token corresponding to each of the identified objects.

5. The method of claim 4, wherein selecting one or more grammars comprises:
traversing, for each identified query token, the grammar forest to identify one or more non-terminal tokens that intersect with the traverse of one or more other identified query tokens; and
selecting one or more of the grammars in the semantic tree adjoining the identified non-terminal tokens.

6. The method of claim 4, wherein selecting one or more grammars comprises:
generating a semantic tree corresponding to the unstructured text query, the semantic tree comprising an intersect token and one or more query tokens, each query token connecting to the intersect by zero or more non-terminal tokens;
analyzing the grammar forest to identify one or more sets of non-terminal tokens and query tokens that substantially match the semantic tree, each set having a non-terminal token corresponding to the intersect token; and
selecting one or more of the grammars in the grammar forest adjoining the non-terminal tokens corresponding to the intersect token.

7. The method of claim 1, further comprising generating a query command based on the unstructured text query.

8. The method of claim 1, wherein generating one or more structured queries comprises:
generating, for each selected grammar, a natural-language string based on the selected grammar, wherein the natural-language string comprises the one or more query tokens of the selected grammar; and
rendering, for each natural-language string, a structured query based on the natural-language string, wherein the structured query comprises references to each identified objects corresponding to query tokens of the selected grammar.

9. The method of claim 1, wherein the unstructured text query comprises one or more n-grams, and wherein each of the identified objects corresponds to at least one of the n-grams.

10. The method of claim 9, wherein each n-gram comprises one or more characters of text entered by the first user.

11. The method of claim 9, wherein each n-gram comprises a contiguous sequence of n items from the text query.

12. The method of claim 9, wherein identifying one or more objects comprises:
determining a score for each n-gram that indicates that the n-gram corresponds to an object associated with the online social network; and
selecting one or more objects having a score greater than a threshold score, each of the selected objects corresponding to at least one of the n-grams.

13. The method of claim 12, wherein the score for each n-gram is a probability that the n-gram corresponds to the object associated with the online social network.

14. The method of claim 1, further comprising:
determining a score for one or more grammars of the plurality of grammars; and
wherein generating one or more structured queries comprises generating one or more structured queries corresponding to each grammar having score greater than a grammar-threshold score.

15. The method of claim 14, wherein determining the score for each grammar is based on a degree of separation in a social graph between the first user and at least one identified object corresponding to at least one query token of the grammar.

16. The method of claim 14, wherein determining the score for each grammar is based on a search history associated with the first user.

17. The method of claim 1, wherein the structured queries are displayed in a user interface of an application associated with the online social network installed on the client system of the first user.

18. The method of claim 1, wherein the structured queries are displayed in a webpage accessed by a web browser on the client system of the first user.

19. One or more computer-readable non-transitory storage media comprising computer instructions that are operable when executed to:

receive, from a client system of a first user of an online social network, an unstructured text query inputted by the first user;

identify, based on the unstructured text query, one or more objects associated with the online social network matching at least a portion of the unstructured text query;

access a context-free grammar model comprising a plurality of grammars, each grammar comprising one or more non-terminal tokens and one or more query tokens, each grammar being an ordered sub-tree adjoining one or more other grammars via a non-terminal token;

generate one or more structured queries, each structured query corresponding to a selected grammar of the context-free grammar model, wherein each structured query comprises a natural-language string generated by the selected grammar, each structured query comprising at least one query token corresponding to each of the identified object, wherein each structured query consists of the natural-language string generated by the selected grammar and one or more query tokens within the natural-language string corresponding to one or more of the identified objects, respectively; and send, to the client system of the first user, one or more of the structured queries as suggested queries for display to the first user in response to the unstructured text query inputted by the first user.

20. A system comprising: one or more processors; and a memory coupled to the processors comprising instructions executable by the processors, the processors executing the instructions to:

receive, from a client system of a first user of an online social network, an unstructured text query inputted by the first user;

identify, based on the unstructured text query, one or more objects associated with the online social network matching at least a portion of the unstructured text query;

access a context-free grammar model comprising a plurality of grammars, each grammar comprising one or more non-terminal tokens and one or more query tokens, each grammar being an ordered sub-tree adjoining one or more other grammars via a non-terminal token;

generate one or more structured queries, each structured query corresponding to a selected grammar of the context-free grammar model, wherein each structured query comprises a natural-language string generated by the selected grammar, each structured query comprising at least one query token corresponding to each of the identified object, wherein each structured query consists of the natural-language string generated by the selected grammar and one or more query tokens within the natural-language string corresponding to one or more of the identified objects, respectively; and send, to the client system of the first user, one or more of the structured queries as suggested queries for display to the first user in response to the unstructured text query inputted by the first user.

\* \* \* \* \*